US005737228A

United States Patent [19]
Ishizuka et al.

[11] Patent Number: 5,737,228
[45] Date of Patent: Apr. 7, 1998

[54] MANUFACTURING PROJECT FORMING METHOD AND DEVICE

[75] Inventors: Hiroaki Ishizuka; Shigeru Matsumoto, both of Osaka, Japan

[73] Assignee: Matsushita Electric Industrial Co., Ltd., Osaka, Japan

[21] Appl. No.: 597,257

[22] Filed: Feb. 6, 1996

[30] Foreign Application Priority Data

| Feb. 9, 1995 | [JP] | Japan | 7-021988 |
| Jun. 29, 1995 | [JP] | Japan | 7-163322 |
| Oct. 20, 1995 | [JP] | Japan | 7-272448 |

[51] Int. Cl.$^6$ .................................................. G06F 19/00
[52] U.S. Cl. ........................... 364/468.08; 364/468.09
[58] Field of Search .......................... 364/468.05–468.1

[56] References Cited

U.S. PATENT DOCUMENTS

| 4,896,269 | 1/1990 | Tong | 364/468 |
| 5,093,794 | 3/1992 | Howie et al. | 364/468 |
| 5,260,868 | 11/1993 | Gupta et al. | 364/402 |
| 5,353,229 | 10/1994 | Tanaka | 364/468 |
| 5,369,570 | 11/1994 | Parad | 364/468 |
| 5,406,476 | 4/1995 | Deziel, Jr. et al. | 364/468 |
| 5,559,710 | 9/1996 | Shahravay et al. | 364/468.06 |
| 5,615,121 | 3/1997 | Babayev et al. | 364/468.06 |

OTHER PUBLICATIONS

Yoshikazu Nishikawa et al., "A Genetic Algorithm As Applied to the Jobshop Scheduling", 1991, TR005 vol. 27, No. 5, pp. 593–599.

Ikuo Matsuba, "Simulated Annealing Method and its Application", System Development Research in Hitachi Corporation, and an English Summary Thereof, date unknown.

Primary Examiner—James P. Trammell
Attorney, Agent, or Firm—McDermott, Will & Emery

[57] ABSTRACT

A variable F (a, n) defined by Equation (1) (wherein k (a, n) is a constant set on a step P (a, n) which is the nth step of a product a, Tave (a, n) is an average wait time for the same step as the step P (a, n) which is obtained from the past processing results, Tw1 (a, n) is a processing wait time which is a time difference between a processing end time for a step P (a, n—1) and a processing start time for the step P (a, n), N (a) is a final step for the product a, Te (a, N(a)) is a end time for a final step P (a, N(a)), Tout (a) is a target delivery date for The product a, and E (a) is the number of steps in which the product a is not yet processed) is set on all manufacturing steps of a product which is put in a manufacturing line. The processing start and end times for each step are determined in such a manner that the absolute value of the variable F (a, n) is smaller than a preset constant Fmax which is equal to or greater than 0 so that an initial manufacturing project is formed. The initial manufacturing project is corrected so as not to violate preset constraint conditions. Equation (1) equals:

$$F(a,n) = K(a,n) \times \{Tave'(a,n) - Tw1(a,n)\} - \{Tave'(a,n+1) - Tw1(a,n+1)\}$$

15 Claims, 36 Drawing Sheets

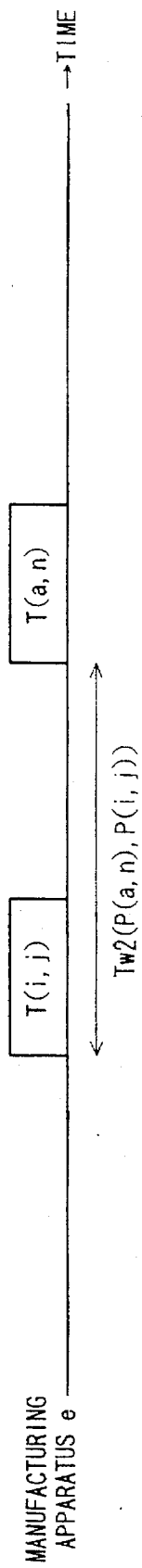

THE NUMBER OF STEPS HAVING THE
SAME PROCESSING CONDITIONS AS
THOSE FOR A STEP P(a,n).

FIG.6
(1) IF STEPS ARE ALLOCATED FOR AN APPARATUS DOWN PERIOD.
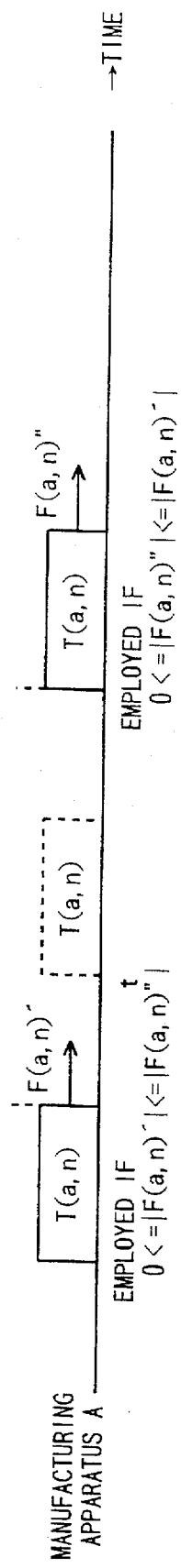
(2) IF THE NUMBER OF BATCH PROCESSING STEPS IS LARGE
IN CASE OF $F(a,na) < F(b,nb) < F(c,nc)$
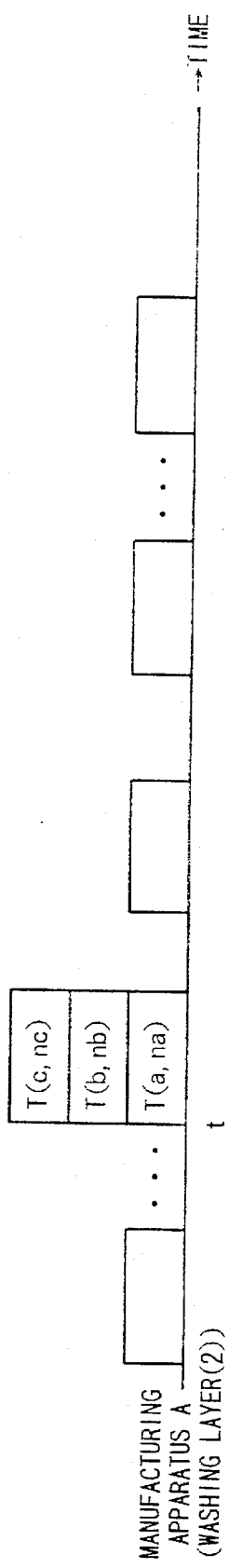
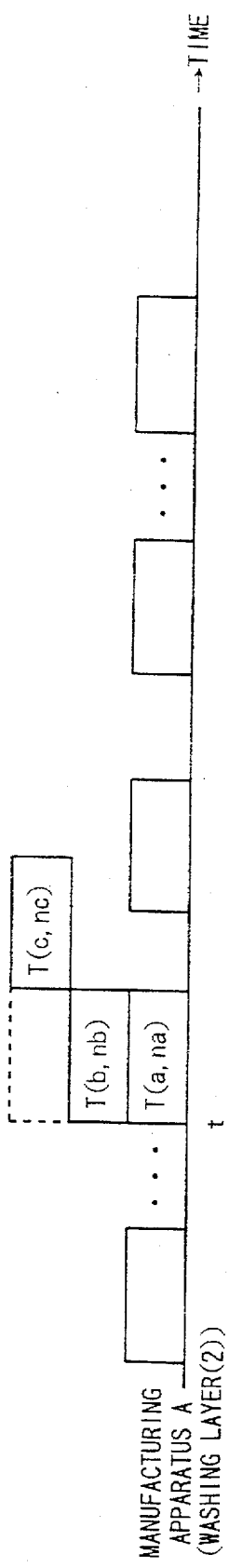

FIG.7

CONSTRAINT CONDITION STORAGE TABLE

| CONSTRAINT CONDITIONS |
|---|
| STEPS ARE NOT ALLOCATED FOR THE DOWN PERIOD OF A MANUFACTURING APPARATUS. THE BATCH PROCESSINGS ARE NOT PERFORMED ON THE STEPS WHOSE NUMBER IS EQUAL TO OR MORE THAN THAT OF THE BATCH PROCESSINGS. $Ts(a, n) \geq Te(a, n-1)$ ... |

FIG. 8

AVERAGE PROCESSING WAIT TIME STORAGE TABLE

| NAME OF STEP | NAME OF MANUFACTURING APPARATUS | AVERAGE PROCESSING WAIT TIME | NUMBER OF BATCH PROCESSINGS |
|---|---|---|---|
| MARK | MARKING PRESS(1) | 20 MIN. | 1 |
| | MARKING PRESS(2) | 30 MIN. | 1 |
| WASH | WASHING LAYER(1) | 20 MIN. | 9 |
| | WASHING LAYER(2) | 25 MIN. | 2 |
| OXIDIZE | OXIDIZING FURNACE(1) | 10 MIN. | 3 |
| | OXIDIZING FURNACE(2) | 15 MIN. | 4 |
| ... | ... | ... | ... |

(1) DETERMINE A BATCH GROUP

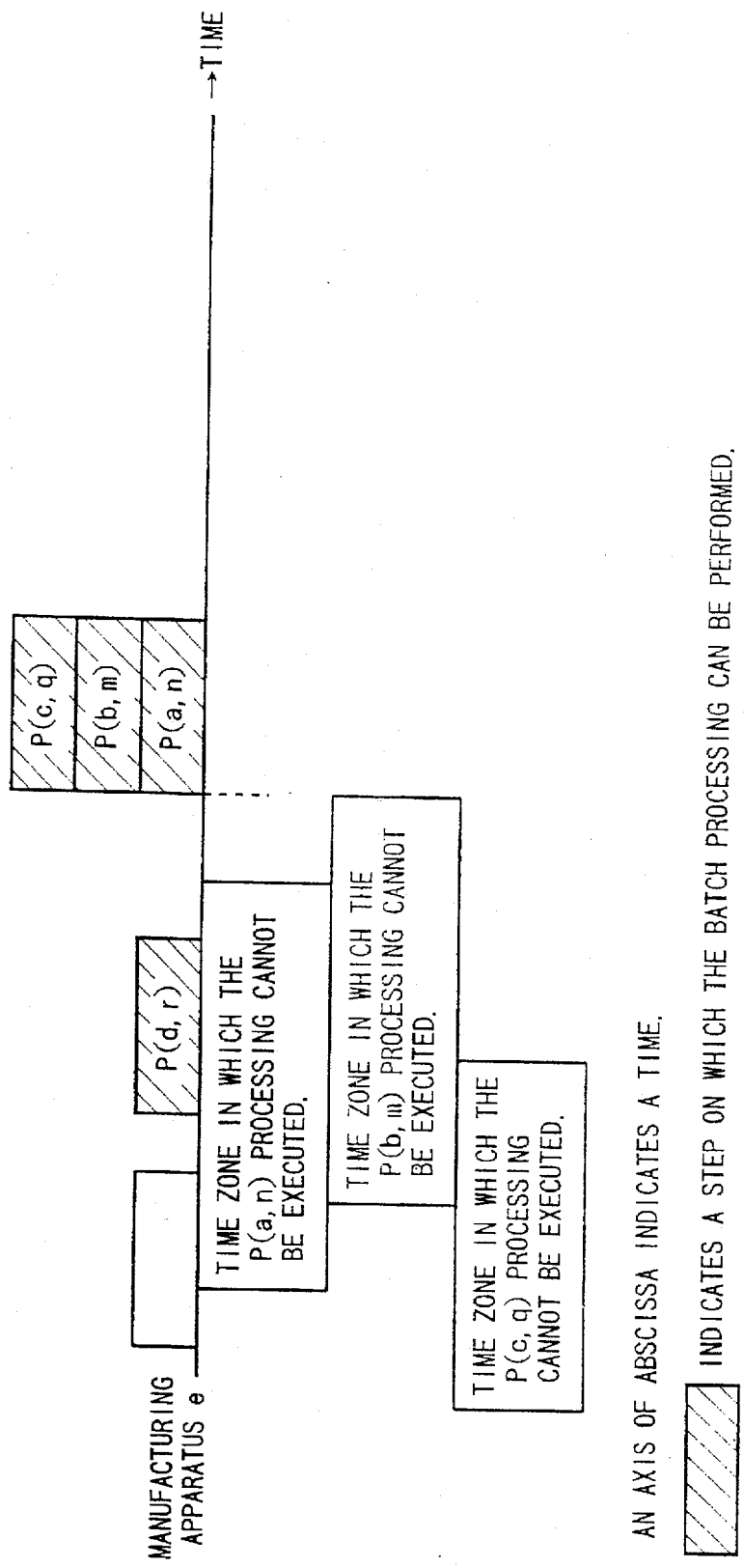

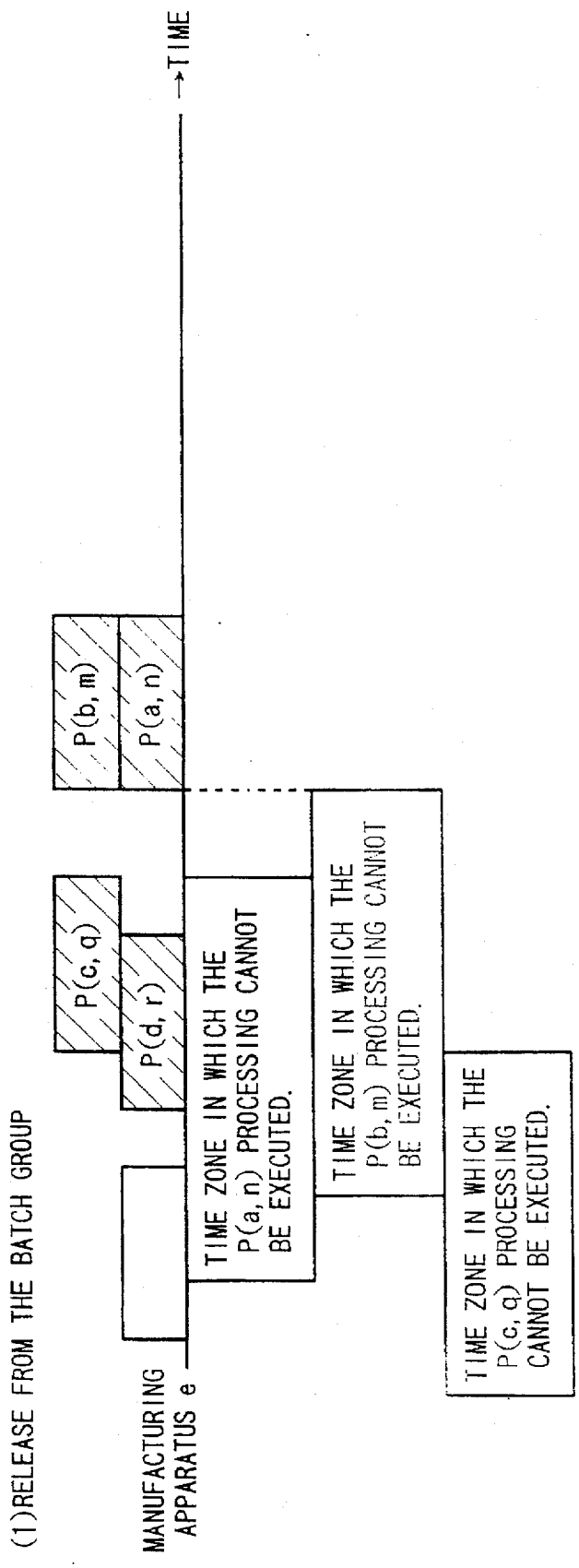

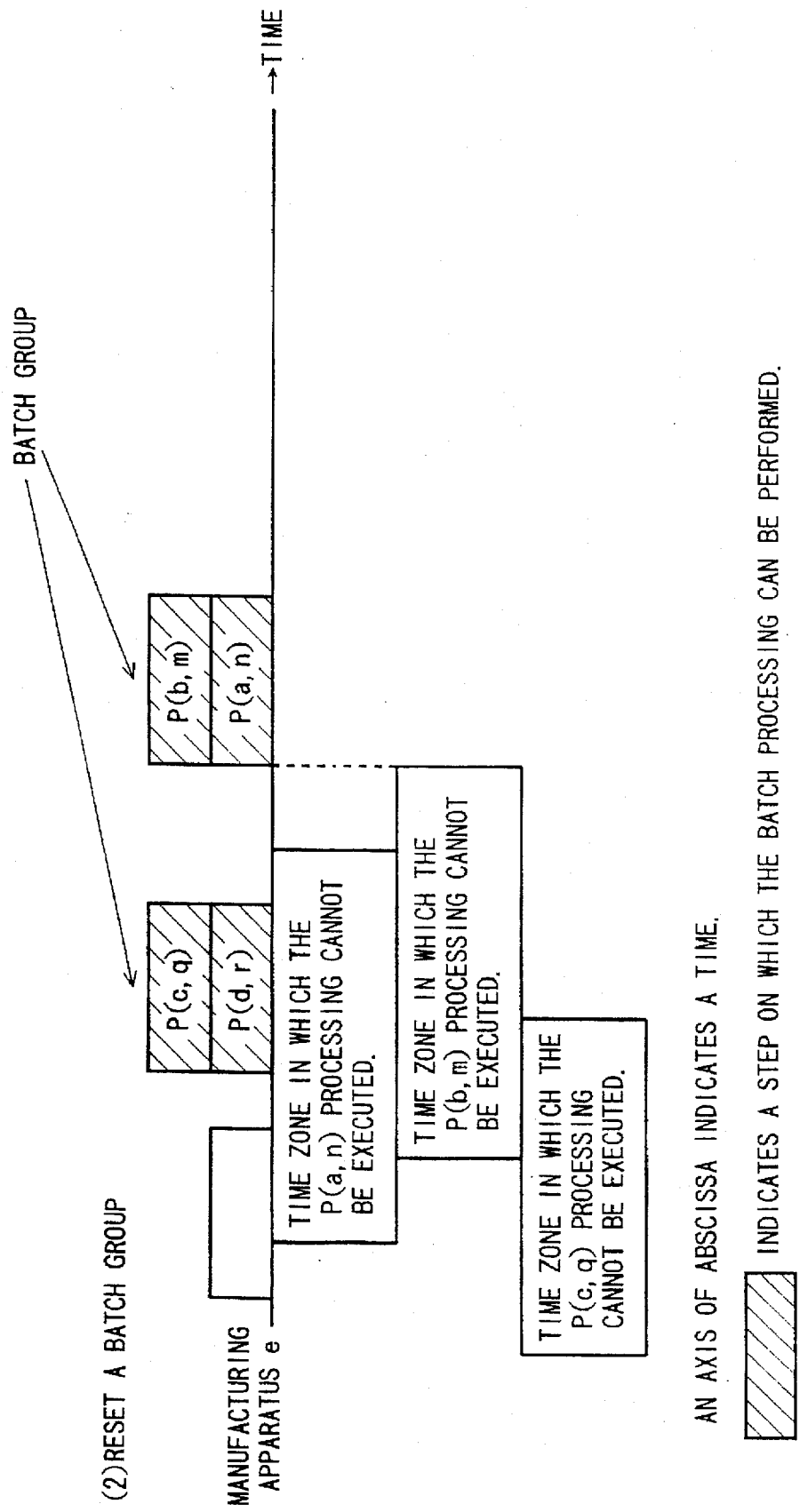

FIG.12

FLOW INFORMATION STORAGE TABLE

| NAME OF PRODUCT | STEP No. | NAME OF STEP | NAME OF PROCESSOR | PROCESSING CONDITIONS | NUMBER OF PROCESSED WAFERS | PROCESSING TIME |
|---|---|---|---|---|---|---|
| PRODUCT (1) | 1 | MARK | MARKING PRESS(1)OR(2) | | 50 PIECES | 20 MIN. |
| | 2 | WASH | WASHING LAYER(1) | | 50 PIECES | 60 MIN. |
| | 3 | OXIDIZE | OXIDIZING FURNACE(1)OR(2) | RECIPE(1) | 50 PIECES | 120 MIN. |
| | ... | ... | ... | ... | ... | ... |
| PRODUCT (2) | 1 | MARK | MARKING PRESS(1)OR(2) | | 40 PIECES | 15 MIN. |
| | 2 | WASH | WASHING LAYER(1) | | 40 PIECES | 60 MIN. |
| | ... | ... | ... | ... | ... | ... |
| ... | | | | | | |

FIG. 13

PROGRESS INFORMATION STORAGE TABLE

| NAME OF PRODUCT | PRIORITY | CURRENT STEP NO. | STATE | TARGET DELIVERY DATE |
|---|---|---|---|---|
| PRODUCT(1) | A | 23 | PROCESSING WAIT | 1994/07/01/12:00 |
| PRODUCT(2) | B | 4 | DURING PROCESSINNG | 1994/08/04/12:00 |
| PRODUCT(3) | C | 12 | PROCESSING WAIT | · · · |
| · · · | · · · | · · · | · · · | · · · |

FIG.14

APPARATUS OPERATION INFORMATION STORAGE TABLE

| NAME OF MANUFACTURING APPARATUS | OPERATION SEGMENT | START TIME | RELEASE TIME |
|---|---|---|---|
| MANUFACTURING APPARATUS(1) | DOWN | 1994/6/20/12:00 | 1994/6/20/13:00 |
| MANUFACTURING APPARATUS(2) | OPERATION | 1994/4/1/8:00 | |
| ⋮ | ⋮ | ⋮ | ⋮ |

FIG.15

MANUFACTURING PROJECT STRAGE TABLE

| NAME OF PRODUCT | STEP No. | PROCESSING START TIME | START SEGMENT | PROCESSING FINISH TIME | FINISH SEGMENT |
|---|---|---|---|---|---|
| PRODUCT (1) | 1 | 1994/6/20/18:00 | PROJECT | 1994/6/20/18:20 | PROJECT |
| | 2 | | PROJECT | | PROJECT |
| | 3 | | PROJECT | | PROJECT |
| | ⋮ | ⋮ | PROJECT | ⋮ | PROJECT |
| PRODUCT (2) | ⋮ | ⋮ | ACTUAL RESULT | ⋮ | ACTUAL RESULT |
| | 31 | 1994/6/20/10:00 | ACTUAL RESULT | 1994/6/20/11:20 | ACTUAL RESULT |
| | 32 | | PROJECT | | PROJECT |
| | 33 | | PROJECT | | PROJECT |
| | 34 | | PROJECT | | PROJECT |
| | ⋮ | ⋮ | ⋮ | ⋮ | ⋮ |
| ⋮ | | | | | |

FIG. 16

(1) IF THE FINAL STEP (No. N(a)) OF THE PRODUCT a IS FINISHED EARLIER THAN A DELIVERY DATE TOUT(a). (Te(a,N(a))<=Tout(a))

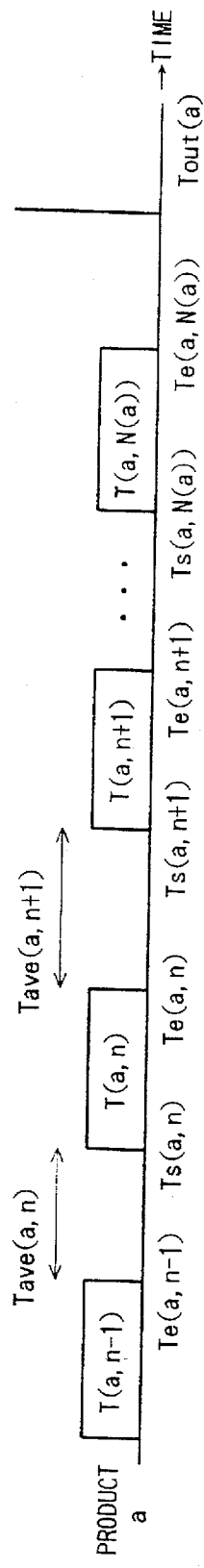

(2) IF THE FINAL STEP (No. N(a)) OF THE PRODUCT a IS FINISHED LATER THAN A DELIVERY DATE TOUT(a). (Te(a,N(a))>>Tout(a)) THE PRODUCT a HAS ALREADY BEEN PROCESSED UNTIL THE (n-1)TH STEP P(a,n-1) AND IS NOT YET PROCESSED ON AND AFTER THE nTH STEP P(a,n).

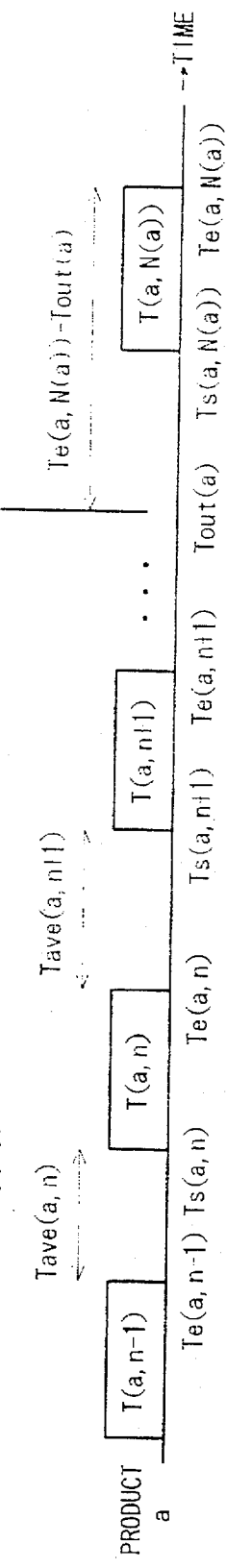

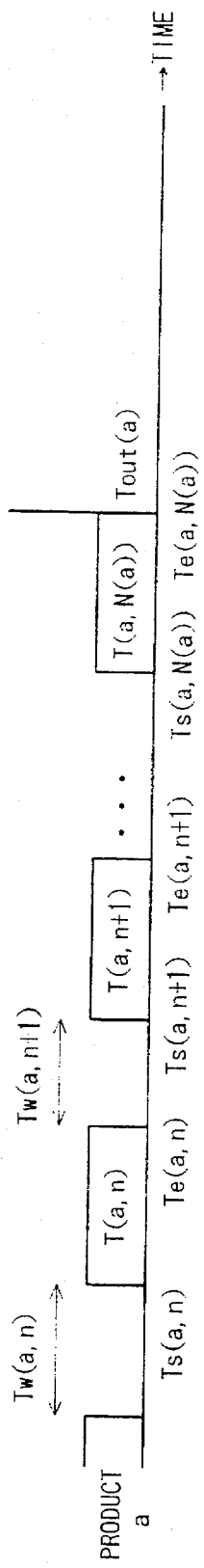

Ts(a,n)=Tave(a,n)-{Te(a,N(a))-Tout(a)}

Tw(a,n)=Tave(a,n)-{Te(a,N(a))-Tout(a)}/E(a)

VALUES FOR ADJACENT STEPS OF THE SAME PRODUCT $f1(a,n) = k(a,n) \times \{Tave'(a,n) - Tw(a,n)\}$ $f2(a,n) = k(a,n+1) \times \{Tave'(a,n+1) - Tw(a,n+1)\}$ $Tave'(a,n) = Tave(a,n)$ (IN CASE OF $T(a,N(a)) \leq Tout(a)$)

$= Tave(a,n) - \{Te(a,N(a)) - Tout(a)\}/N(a)$ (IN CASE OF $T(a,N(a)) > Tout(a)$)

FIG.20

VARIABLE STORAGE TABLE

| NAME OF PRODUCT | STEP NO. | VARIABLE F(a, n) |
|---|---|---|
| PRODUCT(1) | 1 | 50 |
|  | 2 | 20 |
|  | 3 | −10 |
|  | . . . | . . . |
| PRODUCT(2) | 1 | 4 |
|  | 2 | −20 |
|  | . . . | . . . |
| . . . | . . . | . . . |

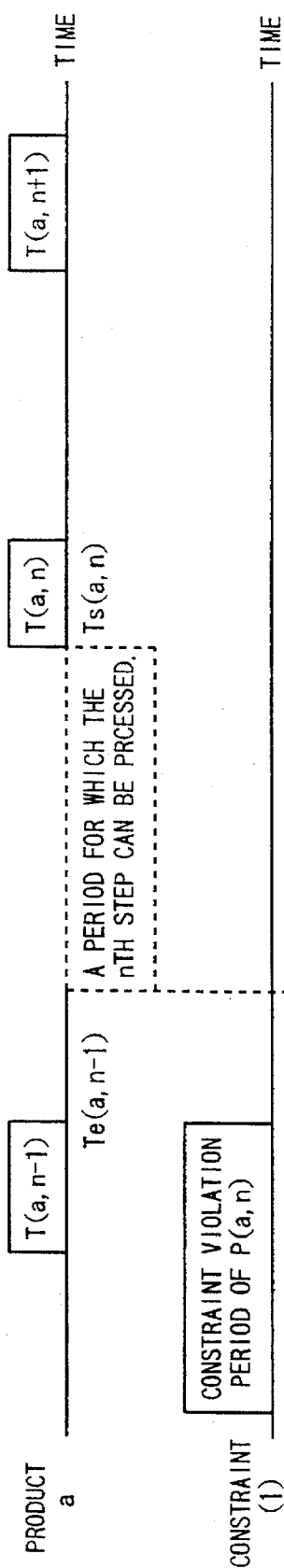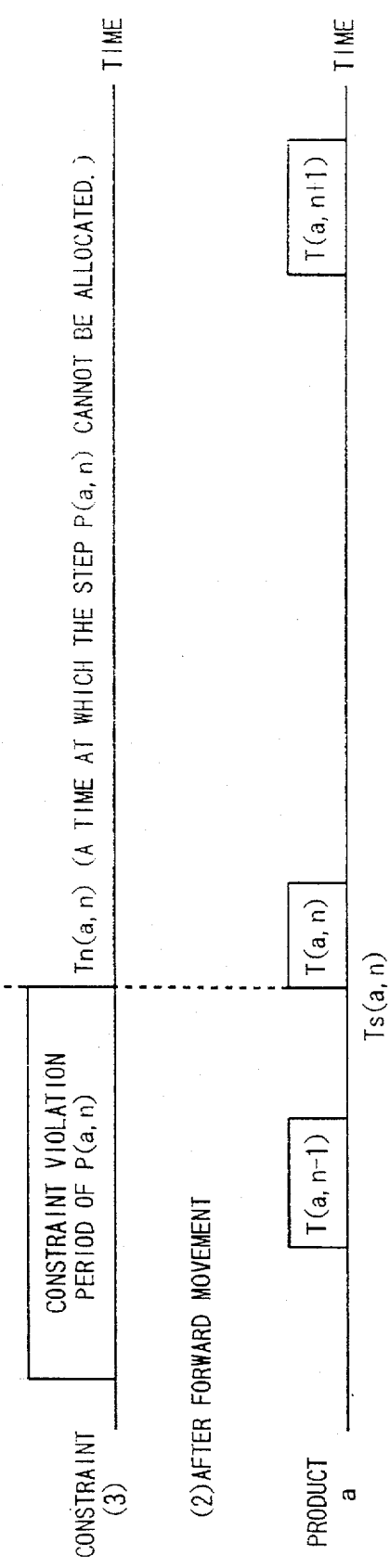
FIG. 21

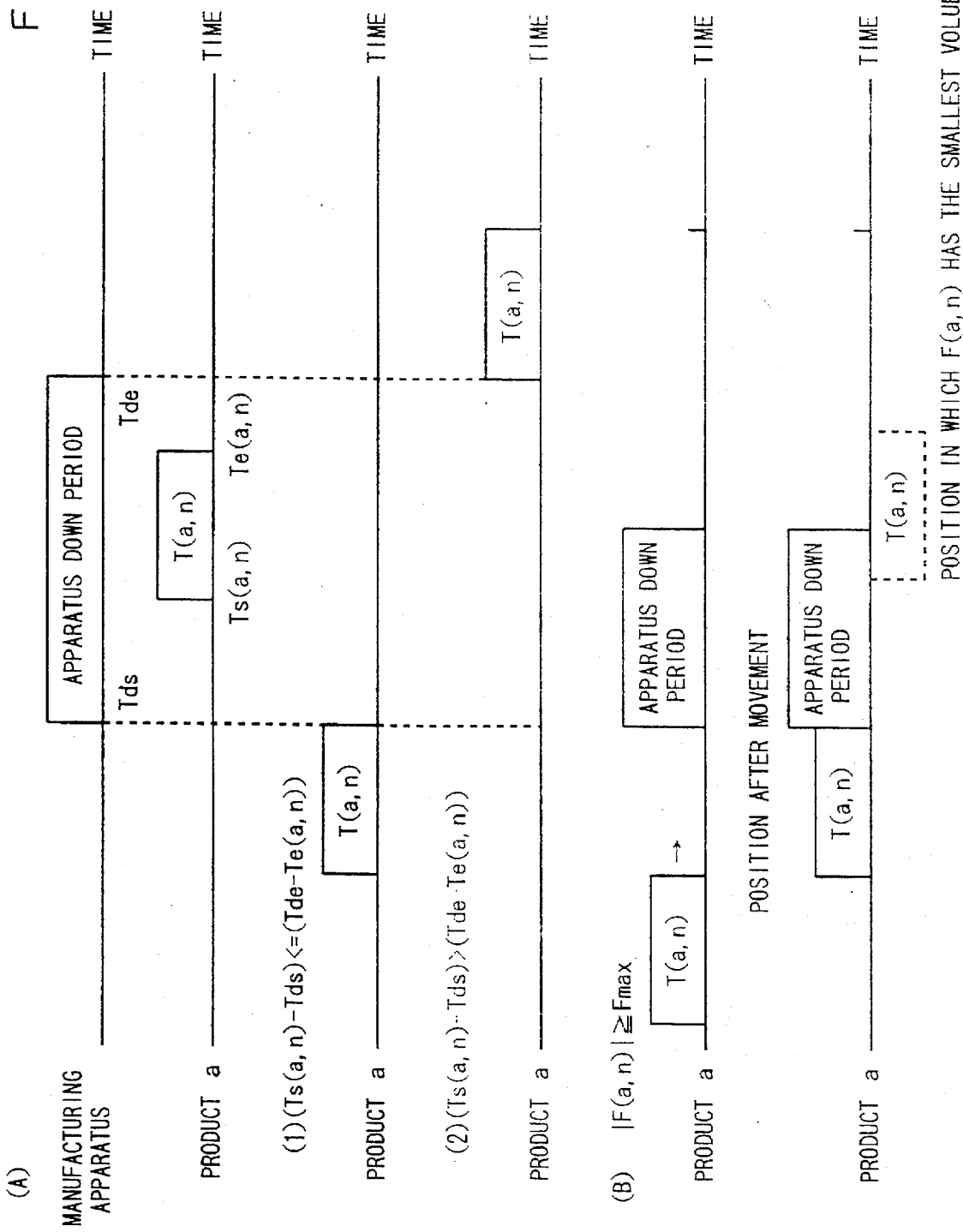

FIG. 24(a)

FIRST MANUFACTURING PROJECT FORMING TABLE

| NAME OF PRODUCT | STEP No. | PROCESSING START TIME | START SEGMENT | PROCESSING FINISH TIME | FINISH SEGMENT |
|---|---|---|---|---|---|
| PRODUCT (1) | 1<br>2<br>3<br>... | 1994/6/20/18:00<br>1994/6/20/<br><br>... | PROJECT<br>PROJECT<br>PROJECT<br>PROJECT | 1994/6/20/18:20<br><br><br>... | PROJECT<br>PROJECT<br>PROJECT<br>PROJECT |
| PRODUCT (2) | ...<br>3 1<br>3 2<br>3 3<br>3 4<br>... | ...<br>1994/6/20/10:00<br><br><br><br>... | ACTUAL RESULT<br>ACTUAL RESULT<br>PROJECT<br>PROJECT<br>PROJECT<br>PROJECT | ...<br>1994/6/20/11:20<br><br><br><br>... | ACTUAL RESULT<br>ACTUAL RESULT<br>PROJECT<br>PROJECT<br>PROJECT<br>PROJECT |
| ... | ... | ... | ... | ... | ... |

FIG. 24(b)

SECOND MANUFACTURING PROJECT FORMING TABLE

| NAME OF PRODUCT | STEP No. | PROCESSING START TIME | START SEGMENT | PROCESSING FINISH TIME | FINISH SEGMENT |
|---|---|---|---|---|---|
| PRODUCT (1) | 1<br>2<br>3<br>... | 1994/6/20/18:00<br>1994/6/20/<br><br>... | PROJECT<br>PROJECT<br>PROJECT<br>PROJECT | 1994/6/20/18:20<br><br><br>... | PROJECT<br>PROJECT<br>PROJECT<br>PROJECT |
| PRODUCT (2) | ...<br>3 1<br>3 2<br>3 3<br>3 4<br>... | ...<br>1994/6/20/10:00<br><br><br><br>... | ACTUAL RESULT<br>ACTUAL RESULT<br>PROJECT<br>PROJECT<br>PROJECT<br>PROJECT | ...<br>1994/6/20/11:20<br><br><br><br>... | ACTUAL RESULT<br>ACTUAL RESULT<br>PROJECT<br>PROJECT<br>PROJECT<br>PROJECT |
| ... | ... | ... | ... | ... | ... |

FIG. 25

PRODUCT UPDATE INFORMATION STORAGE TABLE

| NAME OF PRODUCT | STEP NO. | CHANGE SEGMENT | TIME |
|---|---|---|---|
| PRODUCT(2) | 3 2 | PROCESSING WAIT | |
| PRODUCT(7) | 1 | PRODUCT PUTTING | |
| PRODUCT(15) | 1 0 3 | PAUSE SETTING | 1994/06/29/15:00 |
| . . . | . . . | . . . | . . . |

FIG. 26

APPARATUS UPDATE INFORMATION STORAGE TABLE

| NAME OF MANUFACTURING APPARATUS | CHANGE SEGMENT | CHANGE START TIME | CHANGE FINISH TIME |
|---|---|---|---|
| MANUFACTURING APPARATUS(1) | DOWN SETTING | 1994/6/20/12:00 | 1994/6/20/13:00 |
| MANUFACTURING APPARATUS(5) | DOWN RELEASE | . | . |
| . | . | . | . |
| . | . | . | . |

FIG.31
PRIOR ART

DISPATCHING RULE STORAGE TABLE

| NAME OF MANUFACTURING APPARATUS | DISPATCHING RULE |
|---|---|
| MANUFACTURING APPARATUS(1) | THE SHORTEST ARRANGEMENT TIME |
| MANUFACTURING APPARATUS(2) | ORDER OF ARRIVAL |
| MANUFACTURING APPARATUS(3) | s l a c k RULE |
| . . . | . . . |

MANUFACTURING PROJECT FORMING METHOD AND DEVICE

BACKGROUND OF THE INVENTION

The present invention relates to a method of forming a manufacturing project for a product and a device for the same, and more particularly to a method of forming a manufacturing project and a device for the same which are effective in the formation of the manufacturing project of a manufacturing line which has the batch processing for collectively executing the processing, by a manufacturing apparatus, on a plurality of products having the same processing conditions, and the nonbatch processing for executing the processing every product.

There has been studied a method of forming a manufacturing project for a product using the optimization algorithm or simulation base such as (1) Simulated Annealing Method (Reference: Matsuba (Hitachi, Ltd.) : Simulated Annealing Method and Application, IEEE (1988)), (2) Genetic Algorithm (Reference: Nishikawa (Kyoto University): Application of GA to Scheduling Problem, Instrumentation and Control, Vol. 32, No. 1 (1998)) and the like.

A method of forming a manufacturing project which uses the simulated annealing method according to the prior art will be described below with reference to a flowchart shown in FIG. 29.

FIG. 29 is a flowchart for explaining the method forming a manufacturing project which uses the optimization algorithm according to the prior art.

In Step 501, a provisional plan is made as an initial manufacturing project. Then, a manufacturing project plan whose steps are partly different from those of the provisional plan is made in Step 502.

In Step 503, the accuracies of the manufacturing project plan and the provisional plan are evaluated by an objective function. Either of them having the higher accuracy is stored as a newly provisional plan. The objective function is used when expressing the accuracy of a manufacturing project by a numeric value. For example, if the objective function is expressed by f (x, y, z)=2x+3y+3/z (wherein x is a wait time, y is the number off constraint violations, and z is the total of steps processed for the past month), it is decided that the accuracy of the manufacturing project is higher as a function value f (x, y, z) is smaller.

In Step 504, it is decided whether the manufacturing project is formed again or not after the evaluation of the manufacturing project plan. If a time t from the start of the manufacturing project formation till the present time does not exceed a preset final time (for example, 3 hrs.), the routine returns to Step 502 where a new manufacturing project plan is made again. If the time t exceeds the final time, the manufacturing project formation is completed.

A method of forming a manufacturing project which has the simulation base will be described below with reference to FIGS. 30 and 31. FIG. 30 is a flowchart showing the summary of the method of forming a manufacturing project which has the simulation base. FIG. 31 shows an example of a dispatching rule storage table, in which a dispatching rule is set on each manufacturing apparatus.

In Step 601, a forming start time t=t0 is set at the start of the manufacturing project formation.

In Step 602, it is decided whether the time t reaches a preset final time or not. If it is decided that the time t reaches the preset final time, the manufacturing project formation is completed. If it is decided that the time t does not reach the preset final time, the presence of processing wait steps at the time t is checked in Step 603. If the processing wait steps are present, the steps are aligned in Step 604. If the processing wait steps are not present, the time t is moved forward by $\alpha$ (wherein $\alpha$ is a unit time, for example, 1 min.) in Step 605. Then, the presence of the processing wait steps is checked again. The above operation is continued until the manufacturing project formation is completed.

In Step 604, the steps are aligned in the following manner. The dispatching rule of a manufacturing apparatus which executes the processing at the processing wait steps is retrieved. A step having the highest processing priority is obtained from the processing wait steps based on the retrieved dispatching rule so as to determine the processing start and end times. When the step alignment in Step 604 is completed, the time t is moved forward by $\alpha$ in Step 605. In Step 602, the time t is compared with the final time to determine whether the manufacturing project formation is continued or completed.

Referring to the method of forming a manufacturing project which uses the optimization algorithm, however, steps are combined to perform optimization. For this reason, the manufacturing project plan is remade many times. It takes a half day to 10 days to form the manufacturing project. Consequently, the manufacturing project cannot be formed in a short time.

Referring to the method of forming a manufacturing project which has the simulation base, the time t is continuously moved forward by $\alpha$ from an initial time t0. If there is a product in the processing wait state at each time t, the processing start and end times are set. Accordingly, it is impossible to know when a first product which is currently in the processing wait state and a second product having the same contents of the processing as those of the first product reach the same manufacturing apparatus. For this reason, it is impossible to wait for the second product so as to simultaneously perform the batch processing on the first and second products. Further, it is impossible to execute the processing on other products for a blank time by using the batch processing and increase the number of steps which should be processed every unit time (for example, 1 month) so as to form a manufacturing project in which the TAT of the product is shortened.

The batch processing means that a plurality of products having the same processing conditions are collectively processed by a manufacturing apparatus. The nonbatch processing means that the products are processed one by one.

SUMMARY OF THE INVENTION

In consideration of the above problems, it is an object of the present invention to form, in a short time, a manufacturing project in which the batch processing can be performed and TAT can be shortened.

A first method of forming a manufacturing project according to the present invention is directed to a method of forming a manufacturing project for a product which is put in a manufacturing line comprising an initial manufacturing project forming step of setting, on all manufacturing steps, a variable F (a, n) defined by:

$$F(a, n)=k(a, n)\times\{Tave'(a, n)-Twl(a, n)\}-\{Tave'(a, n+1)-Twl(a, n+1)\} \quad (1)$$

WHEREIN $Tave'(a, n)=Tave(a, n)$ (IN CASE OF $Te(a, N(a))<=Tout(a))=$ $$Tave(a, n) - \{Te(a, N(a)) - Tout(a)\}/E(a) \text{ (IN CASE OF } Te(a, N(a)) > Tout(a))$$

(wherein N (a) is the number of steps of a product a, k (a, n) is a constant set on a step P (a, n) which is the nth step of the product a, Tave (a, n) is an average wait time for the same step as the step P (a, n) which is obtained from the past processing results, Tw1 (a, n) is a processing wait time which is a time difference between a processing end time for a step P (a, n−1) and a processing start time for the step P (a, n), Te (a, N(a)) is a finish time for a final step P (a, N(a)), Tout (a) is a target delivery date for the product a, and E (a) is the number of steps in which the product a is not yet processed), and then determining the processing start and end times for each step in such a manner that the absolute value of the variable F (a, n) is smaller than a preset constant Fmax which is equal to or greater than 0 so that an initial manufacturing project is formed, and a constraint condition canceling step for correcting the initial manufacturing project formed in the initial manufacturing project forming step in such a manner that the initial manufacturing project does not violate preset constraint conditions.

According to the first method of forming a manufacturing project, the first term of Equation (1) has a negative greater value as the processing wait time Tw1 (a, n) for the step P (a, n) is longer than the average wait time Tave (a, n), and has a positive greater value as the processing wait time Tw1 (a, n) is shorter than the average wait time Tave (a, n). The second term of Equation (1) has a negative greater value as the processing wait time Tw1 (a, n+1) for the step P (a, n+1) is longer than the average wait time Tave (a, n+1), and has a positive greater value as the processing wait time Tw1 (a, n+1) is shorter than the average wait time Tave (a, n). Accordingly, the variable F (a, n) of Equation (1) approaches 0 as the processing wait time Tw1 (a, n) for each step approaches the average wait time Tave (a, n). Consequently, each processing wait time of the initial manufacturing project approaches the average wait time so that a manufacturing project in which TAT is shortened can be formed in a short time.

A second method of forming a manufacturing project according to the present invention is directed to a method of forming a manufacturing project for a product which is put in a manufacturing line comprising an initial manufacturing project forming step of setting, on all manufacturing steps, a variable F (a, n) defined by:

$$F(a,n) = \sum_{i=1}^{A} \sum_{j=1}^{N(i)} \delta(P(a,n),P(i,j)) \times f3'(P(a,n),P(i,j)) \times \cos\Theta(P(a,n),P(i,j))/f(a,n) \quad (2)$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

(wherein A is the number of products, N (i) is the number of steps for a product i, G (a, n), h (a, n) and m (a, n) are constants which are common in steps having the same contents of the processing as those of the step P (a, n) which is the nth step of a product a, Tw2 (P (a, n), P (i, j)) is a time difference between a processing start time for the step P (a, n) and the processing start time for a step P (i, j) if a manufacturing apparatus for executing the processing of the step P (a, n) can perform the batch processing, is a time difference between a processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), and is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions for the step P (a, n) are the same as those for the step P (i, j), and has a value of 0 if the processing conditions for the step P (a, n) are different from those for the step P (i, j), f (a, n) is a constant or a function which increases as the number of steps having the same processing conditions as those for the step P (a, n) increases), and then determining the processing start and end times for each step in such a manner that the absolute value of the variable F (a, n) is smaller than a preset constant Fmax which is equal to or greater than 0 so that an initial manufacturing project is formed, and a constraint condition canceling step for correcting the initial manufacturing project formed in the initial manufacturing project forming step in such a manner that the initial manufacturing project does not violate preset constraint conditions.

According to the second method of forming a manufacturing project, if the step P (i, j) having the same contents of the processing as those of the step P (a, n) is provided before the step P (a, n), the variable F (a, n) of Equation (2) has a smaller value as the difference between the processing start times for both steps having the same contents of the processing approaches 0 on the boundary of h (a, n) (see FIG. 28). If the step P (i, j) having the same contents of the processing as those of the step P (a, n) is provided after the step P (a, n), the variable F (a, n) of Equation (2) has a smaller value as the difference between the processing end time for the step P (a, n) and the processing start time for the step P (i, j) approaches 0 on the boundary of h (a, n) (see FIG. 28). Accordingly, the variable F (a, n) of Equation (2) has a smaller value as a step having the same contents of the processing as those of the step P (a, n) is provided closer to the step P (a, n) on the boundary of h (a, n). Consequently, it is possible to form, in a short time, the manufacturing project in which the batch processing can be performed efficiently if steps having the same contents of the processing of the initial manufacturing project are provided in the vicinity.

A third method of forming a manufacturing project according to the present invention is directed to a method of forming a manufacturing project for a product which is put in a manufacturing line comprising an initial manufacturing project forming step of setting, on all manufacturing steps, a variable F (a, n) defined by:

$$F(a,n) = k(a,n) \times \{Tave'(a,n) - Tw1(a,n)\} - \{Tave'(a,n+1) - Tw1(a,n+1)\} + \sum_{i=1}^{A} \sum_{j=1}^{N(i)} \delta(P(a,n),P(i,j)) \times f3'(P(a,n),P(i,j)) \times \cos\Theta(P(a,n),P(i,j))/f(a,n) \quad (3)$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

-continued $$f3'(P(a,n),P(i,j)) = \frac{G(a,n)}{\{Tw(P(a,n),P(i,j))^2 + h(a,n)^2\}^{m(a,n)}}$$

| Tave'(a,n) | = Tave(a,n) | (IN CASE OF Te(a,N(a)) <= Tout(a)) |
|---|---|---|
| | = Tave(a,n) − {Te(a,N(a)) − Tout(a)}/E(a) | (IN CASE OF Te(a,N(a)) > Tout(a)) |

(wherein k (a, n) is a constant set on a step P (a, n) which is the nth step of a product a, Tave (a, n) is an average wait time for the same step as the step P (a, n) which is obtained from the past processing results, Tw1 (a, n) is a processing wait time which is a time difference between a processing end time for a step P (a, n−1) and a processing start time for the step P (a, n), A is the number of products, N (i) is the number of steps for a product i, G (a, n), h (a, n) and m (a, n) are constants which are common in steps having the same contents of the processing as those of the step P (a, n), Tw2 (P (a, n), P (i, j)) is a time difference between the processing start time for the step P (a, n) and the processing start time for a step P (i, j) if a manufacturing apparatus for executing the processing of the step P (a, n) can perform the batch processing, is a time difference between the processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), and is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions for the step P (a, n) are the same as those for the step P (i, j), and has a value of 0 if the processing conditions for the step P (a, n) are different from those for the step P (i, j), f (a, n) is a function of the number of steps having the same processing conditions as those for the step P (a, n), Te (a, N(a)) is a finish time for a final step P (a, N(a)), Tout (a) is a target delivery date for the product a, and E (a) is the number of steps in which the product a is not yet processed), and then determining the processing start and end times for each step in such a manner that the absolute value of the variable F (a, n) is smaller than a preset constant Fmax which is equal to or greater than 0 so that an initial manufacturing project is formed, and a constraint condition canceling step for correcting the initial manufacturing project formed in the initial manufacturing project forming step in such a manner that the initial manufacturing project does not violate preset constraint conditions.

According to the third method of forming a manufacturing project, the variable F (a, n) of Equation (3) approaches 0 as the processing wait time Tw1 (a, n) for each step approaches the average wait time Tave (a, n) and as the step having the same contents of the processing as those of the step P (a, n) is provided closer to the step P (a, n) in the same manner as the first and second methods of forming a manufacturing project. Consequently, it is possible to form, in a short time, the manufacturing project in which the batch processing can be performed efficiently and TAT is shortened.

A first device for forming a manufacturing project according to the present invention comprises line information fetching means for fetching line information such as the operation information about a manufacturing apparatus on a manufacturing line, the beginning information about a product and the like, step allocating means for calculating processing start and end times Ts (a, n) and Te (a, n) for the unprocessed steps out of the step P (a, n) as the nth step of a product a based on the line information fetched by the line information fetching means with:

| Ts(a,n) | = Te(a,n−1) + Tave(a,n) | (IN CASE OF Te(a,N(a)) <= Tout(a)) | (4) |
|---|---|---|---|
| | = Te(a,n−1) + Tave(a,n) − {Te(a,N(a)) − Tout(a)}/E(a) | (IN CASE OF Te(a,N(a)) > Tout(a)) | |

$$Te(a,n) = Ts(a,n) + T(a,n) \quad (5)$$

(wherein Tave (a, n) is an average wait time for the same step as the step P (a, n) which is obtained from the past processing results, N(a) is a final step for the product a, Te (a, N(a)) is a finish time for a final step P (a, N(a)), Tout (a) is a target delivery date for the product a, E (a) is the number of steps in which the product a is not yet processed, and T (a, n) is a processing time for the nth step of the product a), variable calculating means for calculating each variable F (a, n) of the unprocessed steps by:

$$F(a,n) = k(a,n) \times \{Tave'(a,n) - Tw1(a,n)\} - \{Tave'(a,n+1) - \quad (6)$$

$$Tw1(a,n+1)\} + \sum_{i=1}^{A}\sum_{j=1}^{N(i)} \delta(P(a,n),P(i,j)) \times f3'(P(a,n),P(i,j)) \times$$

$$\cos\Theta(P(a,n),P(i,j))/f(a,n)$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

| Tave'(a,n) | = Tave(a,n) | (IN CASE OF Te(a,N(a)) <= Tout(a)) |
|---|---|---|
| | = Tave(a,n) − {Te(a,N(a)) − Tout(a)}/E(a) | (IN CASE OF Te(a,N(a)) > Tout(a)) |
| Tw1(a,n) | = Ts(a,n) − Te(a,n−1) | |

(wherein k (a, n) is a constant set on the step P (a, n), Tave (a, n) is an average wait time for the same step as the step P (a, n) which is obtained from the past processing results, Tw1 (a, n) is a processing wait time which is a time difference between the processing end time for a step P (a, n−1) and the processing start time for the step P (a, n), A is the number of products, N (i) is the number of steps for a product i, G (a, n), h (a, n) and m (a, n) are constants which are common in steps having the same contents of the processing as those of the step P (a, n), Tw2 (P (a, n), P (i, j)) is a time difference between the processing start time for the step P (a, n) and the processing start time for a step P (i, j) if a manufacturing apparatus for executing the processing of the step P (a, n) can perform the batch processing, is a time difference between the processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), and is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions for the step P (a, n) are the same as those for the step P (i, j), and has a value of 0 if the processing conditions for the step P (a, n) are different from those for the step P (i, j), f (a, n) is a function of the number of steps having the same processing conditions as those for the step P (a, n), Te (a, N(a)) is a finish time for a final step P (a, N(a)), Tout (a) is a target delivery date for the product a, and E (a) is the number of steps in which the product a is not yet processed), step moving means for changing the processing start and end times Ts (a, n) and Te (a, n) in such a manner that the processing of each step is started at the time when the variable F (a, n) is equal to or smaller than a preset constant Fmax sequentially from a step having the greatest absolute value of the variable F (a, n) obtained by the variable calculating means so that an initial manufacturing project is created, and constraint condition canceling means for correcting the initial manufacturing project created by the step moving means in such a manner that the initial manufacturing project does not violate preset constraint conditions so that the manufacturing project is formed.

According to the first device for forming a manufacturing project, the processing start time for each step can be moved forward by Equation (4) if the processing end time for the final step P (a, N(a)) is later than the delivery date Tout (a). Consequently, the delivery date can surely be observed. By Equation (6), the variable F (a, n) approaches 0 as the processing wait time Tw1 (a, n) for each step approaches the average wait time Tave (a, n), and the variable F (a, n) has a greater value as a step having the same contents of the processing as those of the step P (a, n) is provided closer to the step P (a, n) in the same manner as the first and second methods of forming a manufacturing project. Consequently, the batch processing can be performed efficiently and TAT can be shortened. Thus, it is possible to form, in a short time, a manufacturing project in which the batch processing can be performed efficiently and the TAT is shortened.

A second device for forming a manufacturing project according to the present invention comprises line information fetching means for fetching line information such as the operation information about a manufacturing apparatus on a manufacturing line, the beginning information about a product and the like, line update information fetching means for fetching the updated line information if any, step allocating means for calculating processing start and end times Ts (a, n) and Te (a, n) for the unprocessed steps out of the step P (a, n) as the nth step of a product a based on the line information fetched by the line information fetching means with:

$$Ts(a,n) = Te(a,n-1) + Tave(a,n) \quad \text{(IN CASE OF } Te(a,N(a)) <= Tout(a)\text{)} \quad (7)$$

$$= Te(a,n-1) + Tave(a,n) - \{Te(a,N(a)) - Tout(a)\}/E(a) \quad \text{(IN CASE OF } Te(a,N(a)) > Tout(a)\text{)}$$

$$Te(a,n) = Ts(a,n) + T(a,n) \quad (8)$$

(wherein Tave (a, n) is an average wait time for the same step as the step P (a, n) which is obtained from the past processing results, N (a) is a final step for the product a, Te (a, N(a)) is a end time for a final step P (a, N(a)), Tout (a) is a target delivery date for the product a, E (a) is the number of steps in which the product a is not yet processed, and T (a, n) is a processing time for the nth step of the product a), variable calculating means for calculating each variable F (a, n) of the unprocessed manufacturing steps by:

$$F(a,n) = k(a,n) \times \{Tave'(a,n) - Tw1(a,n)\} - \{Tave'(a,n+1) - Tw1(a,n+1)\} + \sum_{i=1}^{A} \sum_{j=1}^{N(i)} \delta(P(a,n),P(i,j)) \times f3'(P(a,n),P(i,j)) \times \cos\Theta(P(a,n),P(i,j))/f(a,n) \quad (9)$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

$$Tave'(a,n) = Tave(a,n) \quad \text{(IN CASE OF } Te(a,N(a)) <= Tout(a)\text{)}$$

$$= Tave(a,n) - \{Te(a,N(a)) - Tout(a)\}/E(a) \quad \text{(IN CASE OF } Te(a,N(a)) > Tout(a)\text{)}$$

$$Tw1(a,n) = Ts(a,n) - Te(a,n-1)$$

(wherein k (a, n) is a constant set on the step P (a, n), Tw1 (a, n) is a processing wait time which is a time difference between the processing end time for a step P (a, n−1) and the processing start time for the step P (a, n), A is the number of products, N (i) is the number of steps for a product i, G (a, n), h (a, n) and m (a, n) are constants which are common in steps having the same contents of the processing as those of the step P (a, n), Tw2 (P (a, n), P (i, j)) is a time difference between the processing start time for the step P (a, n) and the processing start time for a step P (i, j) if a manufacturing apparatus for executing the processing off the step P (a, n) can perform the batch processing, is a time difference between the processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), and is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions for the step P (a, n) are the same as those for the step P (i, j), and has a value of 0 if the processing conditions for the step P (a, n) are different from those for the step P (i, j), and f (a, n) is a constant or a function which increases as the number of steps having the same processing conditions as those for the step P (a, n) increases), step moving means for changing the processing start and end times Ts (a, n) and Te (a, n) in such a manner that the processing of each step is started at the time when the variable F (a, n) is equal to or smaller than a preset constant Fmax sequentially from a step having the greatest absolute value of the variable F (a, n) obtained by the variable calculating means so that an initial manufacturing project is created, initial manufacturing project duplicating means for duplicating the initial manufacturing project created by the step moving means to create two initial manufacturing projects, and constraint condition canceling means for correcting one of the initial manufacturing projects created by the initial manufacturing project duplicating means in such a manner that the initial manufacturing project does not violate preset constraint conditions so that a manufacturing project is formed, wherein the step allocating means has the function of calculating the processing start and end times Ts (a, n) and Te (a, n) for the manufacturing step which should be updated, with Equations (7) and (8), based on the updated line information fetched by the line update information fetching means and the other initial manufacturing project created by the initial manufacturing project duplicating means, and wherein the variable calculating means has the function of calculating, with Equation (9), the variable F (a, n) of the manufacturing step which should be updated.

According to the second device for forming a manufacturing project, if the processing end time for the final step P (a, N(a)) is later than the delivery date Tout (a), the processing start time for each step can be moved forward by Equation (4) so that it is possible to form a project which can observe the delivery date. By Equation (6), the variable F (a, n) approaches 0 as the processing wait time Tw1 (a, n) for each step approaches the average wait time Tave (a, n) and as the step having the same contents of the processing as those of the step P (a, n) is provided closer to the step P (a, n) in the same manner as the first and second methods of forming a manufacturing project. Consequently, it is possible to form, in a short time, the manufacturing project in which the batch processing can be performed efficiently and TAT is shortened.

There are provided the line update information fetching means for fetching the updated line information if any and the initial manufacturing project duplicating means for duplicating the initial manufacturing project to create two initial manufacturing projects. Further, the step allocating means has the function of calculating the processing start and end times Ts (a, n) and Te (a, n) for the manufacturing step which should be updated based on the updated line information fetched by the line update information fetching means. Therefore, the initial manufacturing project which has been created last time can be corrected. In addition, the constraint violations of the corrected initial manufacturing project can be canceled to form a manufacturing project. Consequently, it is possible to instantaneously deal with the case where the line information such as the operation information about a manufacturing apparatus, the beginning information about the product and the like are updated.

It is preferred that the first or second device for forming a manufacturing project further comprises forward moving means for moving forward the processing start and end times Ts (a, n) and Te (a, n) for each manufacturing step of the manufacturing project formed by the constraint condition canceling means within the range in which the manufacturing project does not violate the constraint conditions.

Since the forward moving means is provided, it is possible to move forward the processing start and end times Ts (a, n) and Te (a, n) for each manufacturing step of the manufacturing project within the range in which the constraint conditions are not violated. Consequently, it is possible to shorten the TAT off the manufacturing project more.

It is preferred that the first or second device for forming a manufacturing project further comprises initial manufacturing project forming time checking means for deciding whether the variable F (a, n) should be caLculated again by the variable calculating means or not after the step allocating means finds the variable F (a, n), causing the variable calculating means to calculate the variable F (a, n) again, then causing the step moving means to change the processing start and end times Ts (a, n) and Te (a, n) again so as to start the processing at the time when the variable F (a, n) calculated again is equal to or smaller than a preset constant Fmax so that the initial manufacturing project is created if the initial manufacturing project forming time checking means decides that the variable F (a, n) should be calculated again, and causing the constraint condition canceling means to correct the initial manufacturing project created by the step allocating means in such a manner that the initial manufacturing project does not violate preset constraint conditions so that the manufacturing project is formed if the initial manufacturing project forming time checking means decides that the variable F (a, n) should not be calculated again.

Since the initial manufacturing project forming time checking means is provided, it is decided whether the variable F (a, n) should be calculated again or not after the step allocating means finds the variable F (a, n). there is enough time for project formation, the variable F (a, n) is calculated again. The processing start and end times Ts (a, n) and Te (a, n) are changed so as to start the processing at the time when the variable F (a, n) calculated again is equal to or smaller than the constant Fmax, so that the initial. manufacturing project can be created. Consequently, it is possible to shorten the TAT of the manufacturing project more.

It is preferred that the first or second device for forming a manufacturing project further comprises means for moving the nth step of a product a before or after the down period of a processor for executing the processing of the nth step of the product a if the processor is in the down state for a processing period defined by the processing start and end times Ts (a, n) and Te (a, n) obtained by the step allocating means.

Thus, the nth step of the product a can be moved before or after the down period of the processor for executing the processing of the nth step of the product a if the processor is in the down state for the processing period defined by the processing start and end times obtained by the step allocating means. Consequently, it is possible to form the initial manufacturing project in which the processor in the down state is previously taken into consideration.

It is preferred that the first device for forming a manufacturing project further comprises constant setting means having initializing means for setting constants k (a, n), m (a, n) and h (a, n) in Equation (6) to optional initial-values, constant selecting means for selecting other values which are different from the initial-values, and constant changing means for changing the constants k (a, n), m (a, n) and h (a, n) from the initial-values to the other values so as to set the changed values, manufacturing project evaluating means for evaluating the validity of the manufacturing project formed by the constraint condition canceling means, and constant setting time checking means for deciding whether a time for the processing executed by the constant setting means is within the range of a preset constant setting time, causing the constant setting means to continue the processing if the time for the processing is shorter than the constant setting time, and causing the constant setting means to complete the processing if the time for the processing is equal to or longer than the constant setting time, wherein the variable calculating means has the function of calculating the variable F (a, n) with Equation (8) based on the initial-value set by the initializing means and the changed value set by the constant changing means.

It is preferred that the second device for forming a manufacturing project further comprises constant setting means having initializing means for setting constants k (a, n), m (a, n) and h (a, n) in Equation (9) to optional initial-values, constant selecting means for selecting other values which are different from the initial-values, and constant changing means for changing the constants k (a, n), m (a, n) and h (a, n) from the initial-values to the other values so as to set the changed values, manufacturing project evaluating means for evaluating the validity of the manufacturing project formed by the constraint condition canceling means, and constant setting time checking means for deciding whether a time for the processing executed by the constant setting means is within the range of a preset constant setting time, causing the constant setting means to continue the processing if the time for the processing is shorter than the constant setting time, and causing the constant setting means to complete the processing if the time for the processing is equal to or longer than the constant setting time, wherein the variable calculating means has the function of calculating the variable F (a, n) with Equation (9) based on the initial value set by the initializing means and the changed value set by the constant changing means.

Thus, the constant setting means is provided so that the optimal constants k (a, n), m (a, n) and h (a, n) can be set to optimize the variable F (a, n). Consequently, it is possible to form, in a short time, a manufacturing project in which TAT is shortened more.

It is preferred that the first or second device for forming a manufacturing project further comprises processor selecting means for selecting a processor which is the most suitable for the processing of each step if there are a plurality of processors used for the processing of each step. Thus, in the case where there are a plurality of processors, the optimal processor such as a processor having the shortest average processing wait time or a processor having the best yield can be selected.

These and other objects, features, aspects and advantages of the present invention will become more apparent from the following detailed description of the present invention when taken in conjunction with the accompanying drawings.

BRIEF DESCRIPTION OF THE DRAWINGS

The present invention will be detailed in conjunction with accompanying drawings in which:

FIGS. 4(a), 4(b) are diagrams for explaining the method of forming an initial manufacturing project in the method of forming a manufacturing project;

FIG. 6 is a diagram for explaining a method of canceling constraint violations in the method of forming a manufacturing project;

FIG. 7 is a diagram showing an example of a constraint condition storage table used in the method of forming a manufacturing project and the first and second devices for forming a manufacturing project which implement the method of forming a manufacturing project;

FIG. 8 is a diagram showing an example of an average processing wait time storage table used in the method of forming a manufacturing project and the first and second devices for forming a manufacturing project;

FIGS. 9(a), 9(b) are diagrams for explaining a constraint violation canceling step in the method of forming a manufacturing project according to the embodiment of the present invention;

FIGS. 10(a), 10(b) are diagrams for explaining the constraint violation canceling step in the method of forming a manufacturing project according to the embodiment of the present invention;

FIG. 12 is a diagram showing an example off a flow information storage table used in the first and second devices for forming a manufacturing project;

FIG. 13 is a diagram showing an example of a progress information storage table used in the first and second devices for forming a manufacturing project;

FIG. 14 is a diagram showing an example of an apparatus operation information storage table used in the first and second devices for forming a manufacturing project;

FIG. 15 is a diagram showing an example of a manufacturing project storage table used in the first device for forming a manufacturing project;

FIG. 16 is a diagram for explaining the processing of step allocating means in the first and second devices for forming a manufacturing project;

FIG. 20 is a diagram showing an example of a variable storage table used in the first and second devices for forming a manufacturing project;

FIG. 21 is a diagram for explaining the processing of forward moving means in the first and second devices for forming a manufacturing project;

FIG. 22 is a diagram for explaining the processing executed in the case where the step allocating means has the function of canceling constraint conditions in the first and second devices for forming a manufacturing project;

FIGS. 24(a) and 24(b) are diagrams showing examples of first and second manufacturing project forming tables used in the second device for forming a manufacturing project;

FIG. 25 is a diagram showing an example of a product update information storage table used in the second device for forming a manufacturing project;

FIG. 26 is a diagram showing an example of an apparatus update information storage table used in the second device for forming a manufacturing project;

FIG. 31 is a diagram showing an example of a dispatching rule storage table used in the second method of forming a manufacturing project according to the prior art.

DETAILED DESCRIPTION OF THE INVENTION

Figure 1:
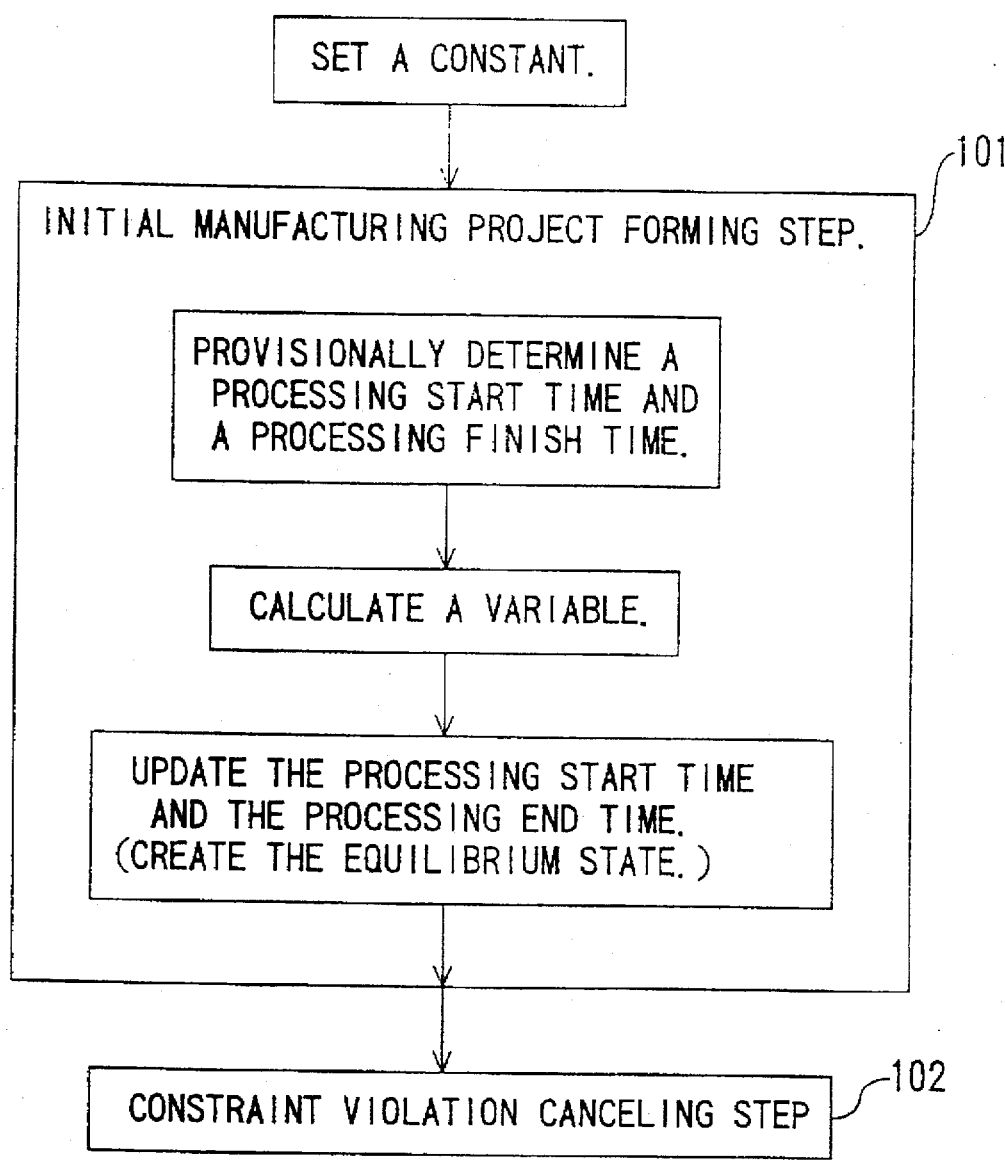
FIG. 1 is a flow chart for a method of forming a manufacturing project according to an embodiment of the present invention.
Figure 2:
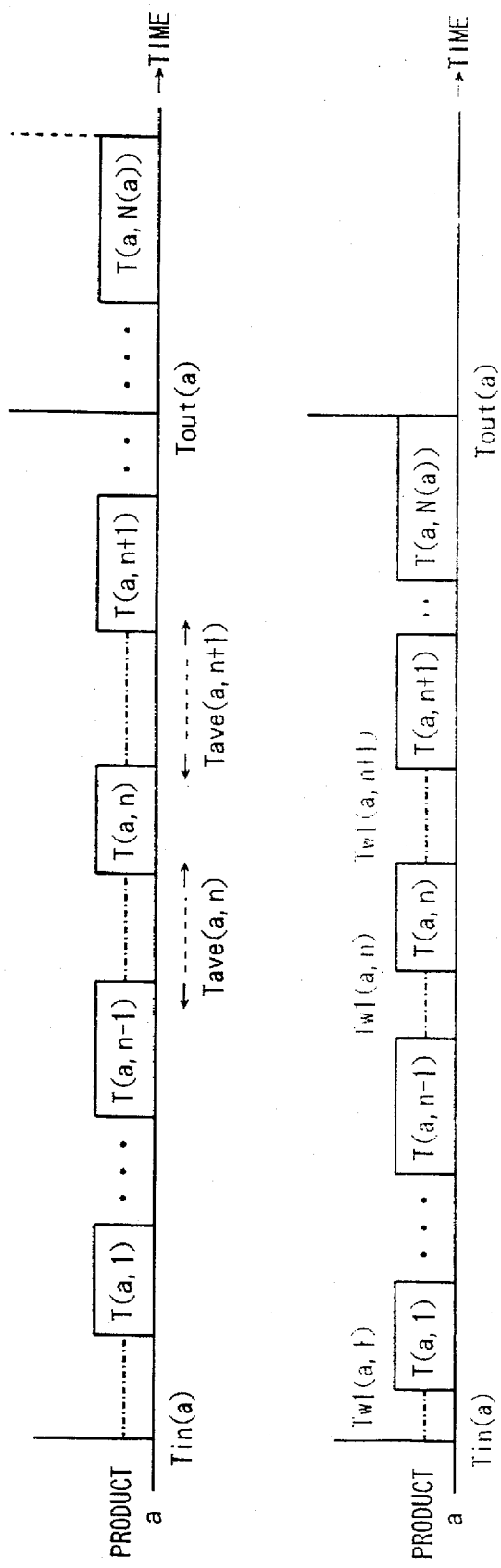
FIG. 2 is a diagram for explaining a method of forming an initial manufacturing project in the method of forming a manufacturing project.
Figure 3:
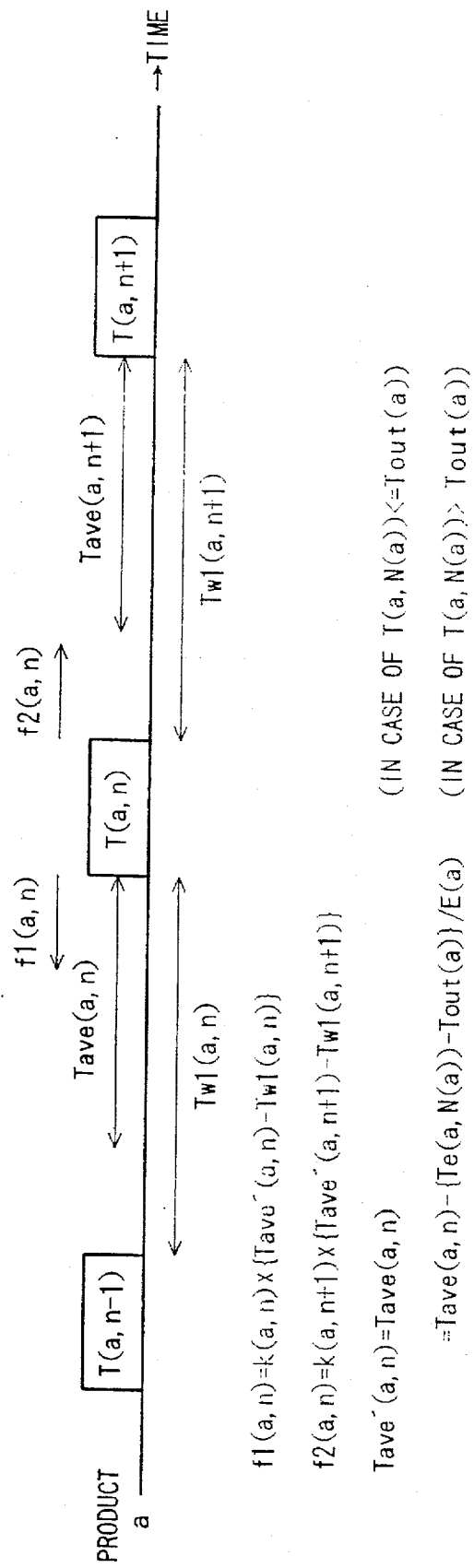
FIG. 3 is a diagram for explaining the method of forming an initial manufacturing project in the method of forming a manufacturing project.

A method of forming a manufacturing project according to the present invention will be described below with reference to FIGS. 1, 2 and 3. FIG. 1 is a flowchart showing the method of forming a manufacturing project. FIGS. 2 and 3 are timing diagrams showing a method of forming an initial manufacturing project in the method of forming a manufacturing project described above, wherein an axis of abscissa indicates a time.

The method of forming a manufacturing project according to the present invention comprises an initial manufacturing project forming step 101 for forming an initial manufacturing project and a constraint violation canceling step 102 for correcting a portion of the initial manufacturing project which violates constraint conditions and forming a new manufacturing project.

The method of forming an initial manufacturing project executed in the initial manufacturing project forming step 101 will be described below.

In the description, each abbreviation means the following contents.

A step P (a, n) means the nth step of a product a, and a step P (a, N(a)) means the final step of the product a.

T (a, n) means a processing time for the nth step of the product a.

k (a, n) is a constant (pseudo spring constant) which is set on the step P (a, n).

Tave (a, n) means an average wait time for the same step as the step P (a, n) which is obtained from the past processing results (i.e., a time difference between a processing end time for a step P (a, n−1) and a processing start time for the step P (a, n)).

Tw1 (a, n) means a processing wait time, i.e., a time difference between the processing end time for the step P (a, n−1) and the processing start time For the step P (a, n).

Ts (a, n) means the processing start time for the seep P (a, n).

Te (a, n) means the processing end time for the step P (a, n).

G (a, n) is a constant (pseudo universal gravitation constant) which is common in other steps having the same contents of the processing as those of the step P (a, n).

E (a) means the number of steps in which the product a is not yet processed.

Tout (a) means a target delivery date for the product a.

Tw2 (P (a, n), P (i, j)) means a time difference between the processing start time for a step P (i, j) and the processing start time for the step P (a, n) if a manufacturing apparatus for executing the processing of the step P (a, n) can perform the batch processing, while it means a time difference between the processing stare time for the step P (a, n) and the processing end time for the step P (i, j) if the manufacturing apparatus for executing the processing of the step P (a, n) cannot perform the batch processing and the processing start time for the step P (i, j) is earlier than the processing start time for the step P (a, n).

δ (P (a, n), P (i, j)) is a variable. More specifically, δ (P (a, n), P (i, j) has a value of 1 if the contents of the processing of the step P (a, n) are the same as those of the step P (i, j), while it has a value of 0 if they are different from each other.

m (a, n) and h (a, n) are constants which are common in other steps having the same contents of the processing as those of the step P (a, n).

F (a, n) is a function of the number of seeps having the same contents of the processing as those of the step P (a, n).

F (a, n) is a variable off the nth step of the product a, and Fmax is a constant which is equal to or greater than 0.

N (a) is the number of steps for the product a.

A is the number of products.

for the processing which should be executed prior to the manufacturing project formation, the average wait time Tave (a, n), the pseudo spring constant k (a, n), the pseudo universal gravitation constant G (a, n), the constant Fmax (≧0), the constant m (a, n) (>0) and the constant h (a, n) which are used for forming the initial manufacturing project are set on all the steps of all products. The average wait time Tave (a, n) is obtained from the past processing results of the product. The constants k (a, n), G (a, n), Fmax, m (a, n) and h (a, n) have suitable values at first, and are updated so as to obtain better objective function values on and after the next step of forming a manufacturing project. The function f (a, n) also has a suitable value at first, and is updated so as to obtain a better objective function value on and after the next step of forming a manufacturing project.

In the initial manufacturing project forming step 101, the processing start and end times for each step are provisionally determined for each product.

A method of determining the processing start and end times for the step of the product a will be described below with reference to FIG. 2. When putting the product a in a manufacturing line, the processing start and end times from a first step P (a, 1) till the final step P (a, N(a)) are determined in such a manner that the processing wait time for the step P (a, n) is expressed by Tave (a, n).

Then, if the processing end time for the final step P (a, N(a)) is later than a delivery date Tout (a), the processing wait time Tw1 (a, n) for each step is set to Tw1 (a, n)−{(the processing end time for the final step P (a, N(a))−Tout(a)}/E(a)] and the processing start and end times are changed sequentially from the first step P (a, 1) so as to observe the delivery date.

After the processing start and end times for all the products are provisionally determined, the variable F (a, n) which is defined by Equation (10) is calculated for all the steps.

$$F(a,n) = f1(a,n) - f2(a,n) + f3(a,n) \quad (10)$$

WHEREIN $$f1(a,n) = k(a,n) \times \{Tave'(a,n) - Tw1(a,n)\}$$

$$f2(a,n) = k(a,n+1) \times \{Tave'(a,n+1) - Tw1(a,n+1)\}$$

$$f3(a,n) = \sum_{i=1}^{A} \sum_{j=1}^{N(i)} \delta(P(a,n),P(i,j)) \times f3'(P(a,n),P(i,j)) \times$$

$$\cos\Theta(P(a,n),P(i,j))/f(a,n)$$

$$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

-continued $$Tave'(a,n) = Tave(a,n) \quad \text{(IN CASE OF } Te(a,N(a)) <= Tout(a))$$
$$= Tave(a,n) - \{Te(a,N(a)) - Tout(a)\}/E(a) \quad \text{(IN CASE OF } Te(a,N(a)) > Tout(a))$$

First of all, the variable F (a, n) is calculated for all the steps. Then, a step in which the absolute value |F (a, n)| of the variable F (a, n) is the greatest is retrieved In case off |F (a, n)|≧ Fmax, the following processing is executed to obtain the absolute value |F (a, n)| of the valuable F (a, n) for all the steps which is smaller than Fmax.

If the variable F (a, n) of the retrieved step is greater than 0, the processing start and end times for the step P (a, n) is delayed by a unit time (for example, 1 min.) to calculate the variables of all the steps having the same contents of the processing as those off the steps P (a, n), P (a, n−1), P (a, n+1) and P (a, n). If the variable F (a, n) is smaller than 0, the processing start and end times .for the step P (a, n) are moved forward by a unit time to recalculate the variables of all the steps having the same contents of the processing as those of the steps P (a, n), P (a, n−1), P (a, n+1) and P (a, n).

If the sign (positive or negative) of the valuable F (a, n) obtained by recalculation is not changed and the absolute value |F (a, n)| of the variable F (a, n) is smaller than that of the valuable obtained before recalculation, the processing start and end times for the step P (a, n) are changed in the same manner as the foregoing.

The above operation is executed for a constant time or until the variables F (a, n) of all the steps have the absolute values |F (a, n)| which are smaller than Fmax. Consequently, the initial manufacturing project formation is completed.

The initial manufacturing project described above has the following three features because the variable F (a, n) is used.

(1) The processing wait time for each step approaches the average wait time.

As the processing wait time Tw1 (a, n) for the step P (a, n) is longer than the average wait time Tave (a, n), f1 (a, n) in Equation (10) has a negative greater value. As the processing wait time Tw1 (a, n) is shorter than the average wait time Tave (a, n), f1 (a, n) has a positive greater value. As the processing wait time Tw1 (a, n+1) for the step P (a, n+1) is longer than the average wait time Tave (a, n+1), f2 (a, n) in Equation (10) has a negative greater value. As the processing wait time Tw1 (a, n+1) is shorter than the average wait time Tave (a, n), f2 (a, n) has a positive greater value. More specifically, as the processing wait time Tw1 (a, n) for each step approaches the average wait time Tave (a, n), {f1 (a, n)−f2 (a, n)} in Equation (10) approaches 0. Accordingly, a wait time for each step of the initial manufacturing project approaches the average wait time by "the update of the processing start and end times" shown in FIG. 1 (see FIG. 3).

(2) The batch processing can be performed.

Figure 4B:
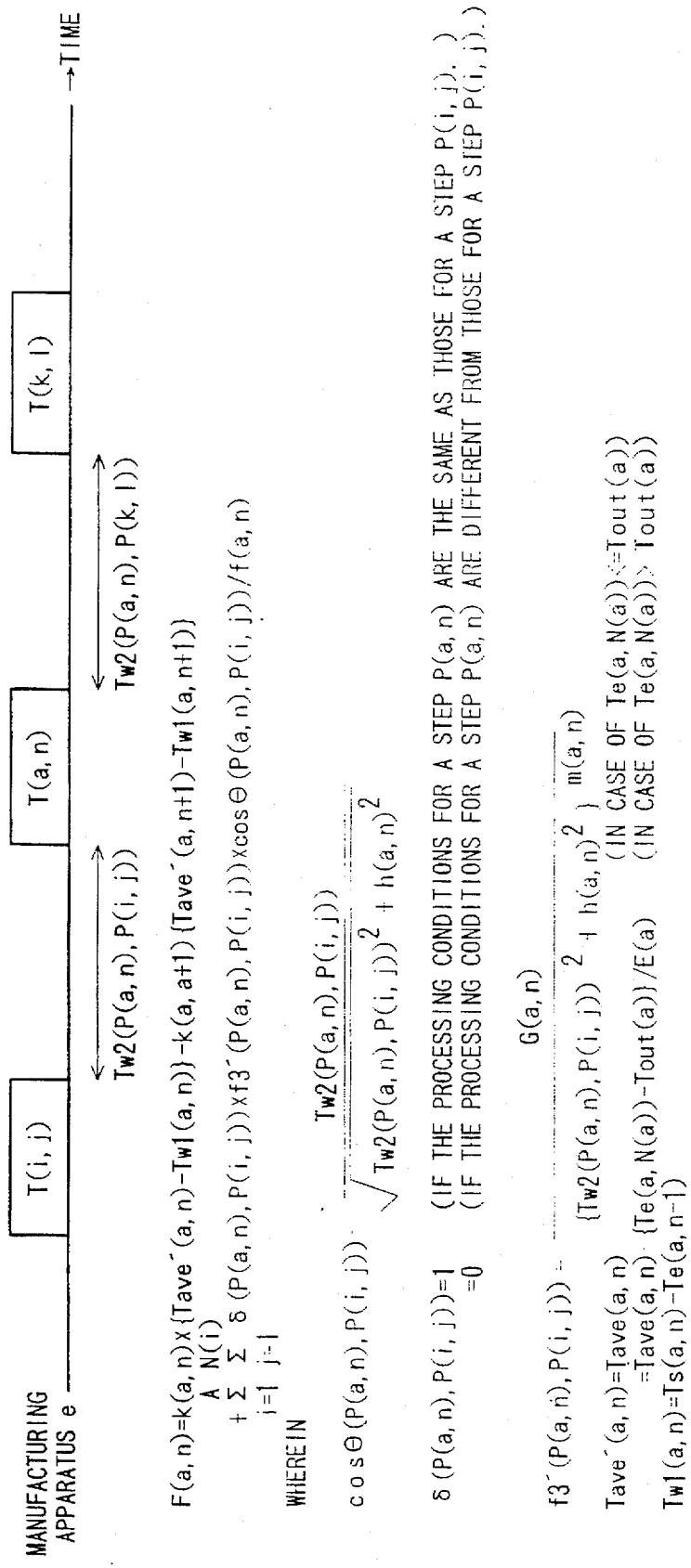

If there is a step P (i, j) having the same contents of the processing as those of the seep P (a, n) and a manufacturing apparatus e for executing the processing of the step P (a, n) can perform the batch processing, f3 (a, n) in Equation (10) approaches 0 when a time difference between the processing start times for both steps is smaller than h (a, n) (see FIGS. 4(a), 4(b)). If the manufacturing apparatus e For executing the processing of the step P (a, n) cannot perform the batch processing and the processing start time for the step P (a, n) is earlier than the processing start time for the step P (i, j), f3 (a, n) in Equation (10) approaches 0 when a time difference between the processing end time for the step P (a, n) and the processing start time for the step P (i, j) is smaller than h (a, n). If the manufacturing apparatus e for executing the processing of the step P (a, n) cannot perform the batch processing and the processing start time for the step P (a, n) is later than the processing start time for the step P (i, j), f3 (a, n) in Equation (10) approaches 0 when a time difference between the processing start time for the step P (a, n) and the processing end time for the step P (i, j) is smaller than h (a, n). Accordingly, if the steps having the same contents of the processing are provided in the vicinity in the initial manufacturing project, the batch processing can be performed efficiently by "the update of the processing start and end times" shown in FIG. 1.

(8) The delivery date can be observed.

The delivery date is taken into consideration by "the provisional determination of the processing start and end times" Therefore, the initial manufacturing project observes the delivery date.

Figure 5:
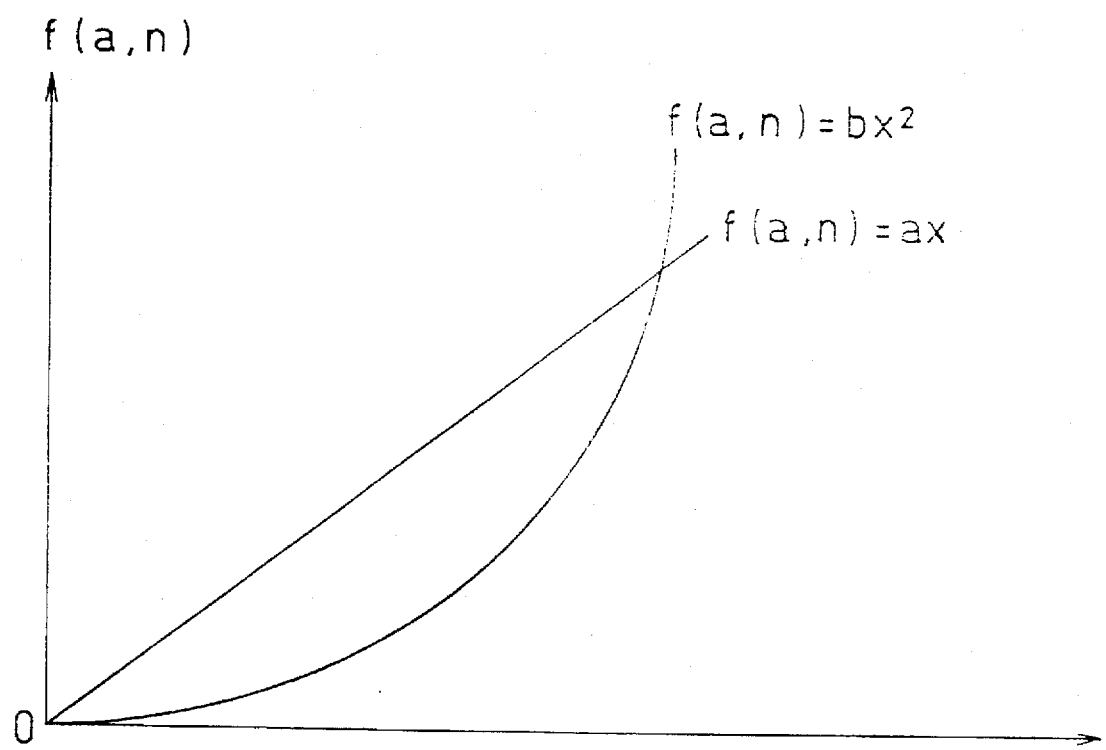
FIG. 5 is a graph showing an example of f (a, n) on the third term of a variable F (a, n) in first and second devices for forming a manufacturing project.

While f (a, n) of f3 (a, n) on the third term of the variable F (a, n) may be a constant, f3 (a, n) has a greater value in a step having the same contents off the processing as those of so many steps if f (a, n) is a constant. Consequently, only the processing start and end times for the step having the same contents of the processing as those of so many steps are updated. Accordingly, the following manner is preferred as shown in FIG. 5. More specifically, as the number of steps having the same contents of the processing as those of the step P (a, n) is larger, the function f (a, n) has a greater value to reduce f3 (a, n) of the step having the same contents of the processing as those of so many steps. Thus, the processing start and end times for all the steps can be updated.

A first method of canceling the constraint violations of the initial manufacturing project which is executed in the constraint violation canceling step 102 will be described below.

First of all, a time t is reset to a current time.

If there is no step which violates the constraint conditions at the time t, the time t is updated to (t+δ) wherein δ is a unit time (for example, 1 min.).

If there are steps which violate the constraint conditions at the time t, the processing start and end times for the steps which violate the constraint conditions are changed so as to cancel the constraint violations.

The method of canceling the constraint violations will be described below with reference to FIGS. 6, 7 and 8.

FIG. 6 is a diagram for explaining the method of canceling the constraint violations which is executed in the constraint violation canceling step 102. FIG. 6 (1) designates the case where steps are allocated for an apparatus down period and FIG. 6 (2) designates the case where the number of steps of performing the batch processing exceeds the capacity of the apparatus, wherein an axis of abscissa indicates a time.

FIG. 7 is a diagram showing an example of a constraint condition storage table.

FIG. 8 is a diagram showing an example of an average processing wait time storage table, wherein an average processing wait time calculated from the past processing results and the number of batch processings that indicates the number of products which can be processed simultaneously are stored every step name and every manufacturing apparatus name.

In the initial manufacturing project forming step 101 shown in FIG. 1, the constraint condition that "Steps are not allocated for the down period of a manufacturing apparatus" stored in the constraint condition storage table shown in FIG. 7 is violated if the step P (a, n) is allocated for the apparatus down period. In this case, the step P (a, n) is moved before or after the down period as shown in FIG. 6 (1) to employ the processing start and end times for the smaller absolute value |F (a, n)| of the variable F (a, n).

In the initial manufacturing project forming step 101, the constraint condition that "The batch processings are not performed on the steps whose number is equal to or more than that of the batch processings" stored in the constraint condition storage table shown in FIG. 7 is violated if the number of the seeps P (a, na), P (b, nb) and P (c, nc) on which the batch processing should be performed is equal to or more than that of batch processings in the average processing wait time storage table shown in FIG. 8. In this case, the variables F (a, na), F (b, nb) and F (c, nc) of three steps which violate the constraint conditions are compared to move backward the processing start and end times for a step having the greatest variable F until the constraint violation is canceled as shown in FIG. 6 (2). Also in the case where other constraint conditions are violated, the processing start and end times for the steps are changed so as to cancel the constraint violations.

After the steps which violate the constraint conditions are eliminated at the time t, the time t is changed to (t+δ).

The above operation is continued until a step having the latest processing start time, so that the manufacturing project formation is completed.

Figure 9A:
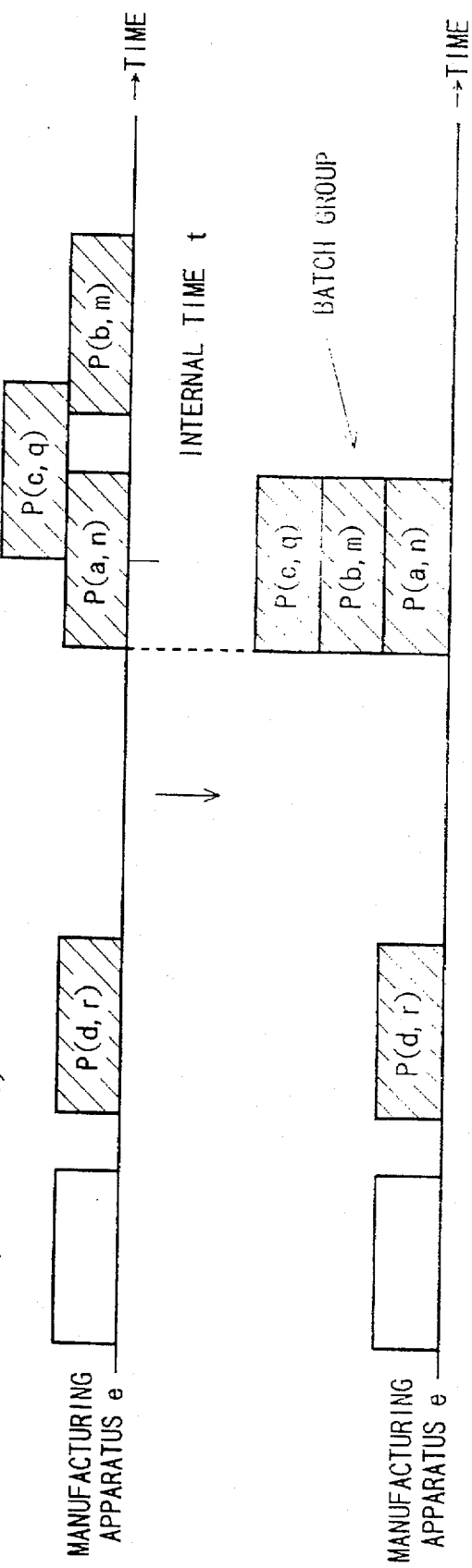

A second method of canceling the constraint violations of the initial manufacturing project which is executed in the constraint violation canceling step 102 will be described below with reference to FIGS. 9 and 10.

FIGS. 9(a), 9(b) and 10(a), 10(b) are timing diagrams for explaining the second method of canceling the constraint violations.

First of all, a time t is reset to a current time.

A step having a processing start time t retrieved from the initial manufacturing project. The processing start and end times for a step which has the same processing conditions as those of the retrieved step and whose time zone from the processing start time till the processing end time overlaps for 1 min. or more are changed to the processing start and end times for the retrieved step (see FIG. 9(a)). Hereinafter, the group of steps whose processing start and end times are changed in the same way is referred to as a batch group. This processing is continued from the time t till the final time of the manufacturing project.

Then, the time t is reset to the current time again and moved forward every unit time to the final time of the manufacturing project. At each time t, the batch group whose processing start time is the time t is retrieved. The processing start and end times for all the steps forming the batch group are moved forward within the range in which the constraint conditions of the constraint condition storage table shown in FIG. 7 are met (see FIG. 9(b)).

In the case where each step forming the batch group whose processing start and end times have been moved forward has a step whose processing end time can be moved forwarder than the processing start time of the batch group, the same step is removed from the batch group to move the processing start and end times forward (see FIG. 10(b)).

In the case where the step which is removed from the batch group to move the processing start and end times forward has the time zone from the processing start till the processing finish that overlaps with the time zone from the processing start till the processing finish of the step having the same contents of the processing, the same step is newly regarded as a batch group so that the processing start and end times are set so as not to violate the constraint conditions shown in FIG. 7 (see FIG. 10(b)).

The above processing is continued from the current time t till the final time of the manufacturing project, so that the manufacturing project formation is completed.

According to the method of forming a manufacturing project in accordance with the present embodiment, the delivery date for each product can be observed. In addition, a manufacturing project which can prevent the longer processing wait time for each step can be formed by the difference between the first and second terms of Equation (10), i.e., {f1 (a, n)–f2 (a, n)}.

Further, the manufacturing project can be formed so as to perform the batch processing on the steps having the same contents of the processing by the third term of Equation (10), i.e., f3 (a, n).

In contrast to the optimization technique, it is not necessary to form the manufacturing project many times. For this reason, the manufacturing project can be formed in a short time.

A first device for forming a manufacturing project which is used for the method of forming a manufacturing project will be described below with reference to the drawings.

Figure 11A:
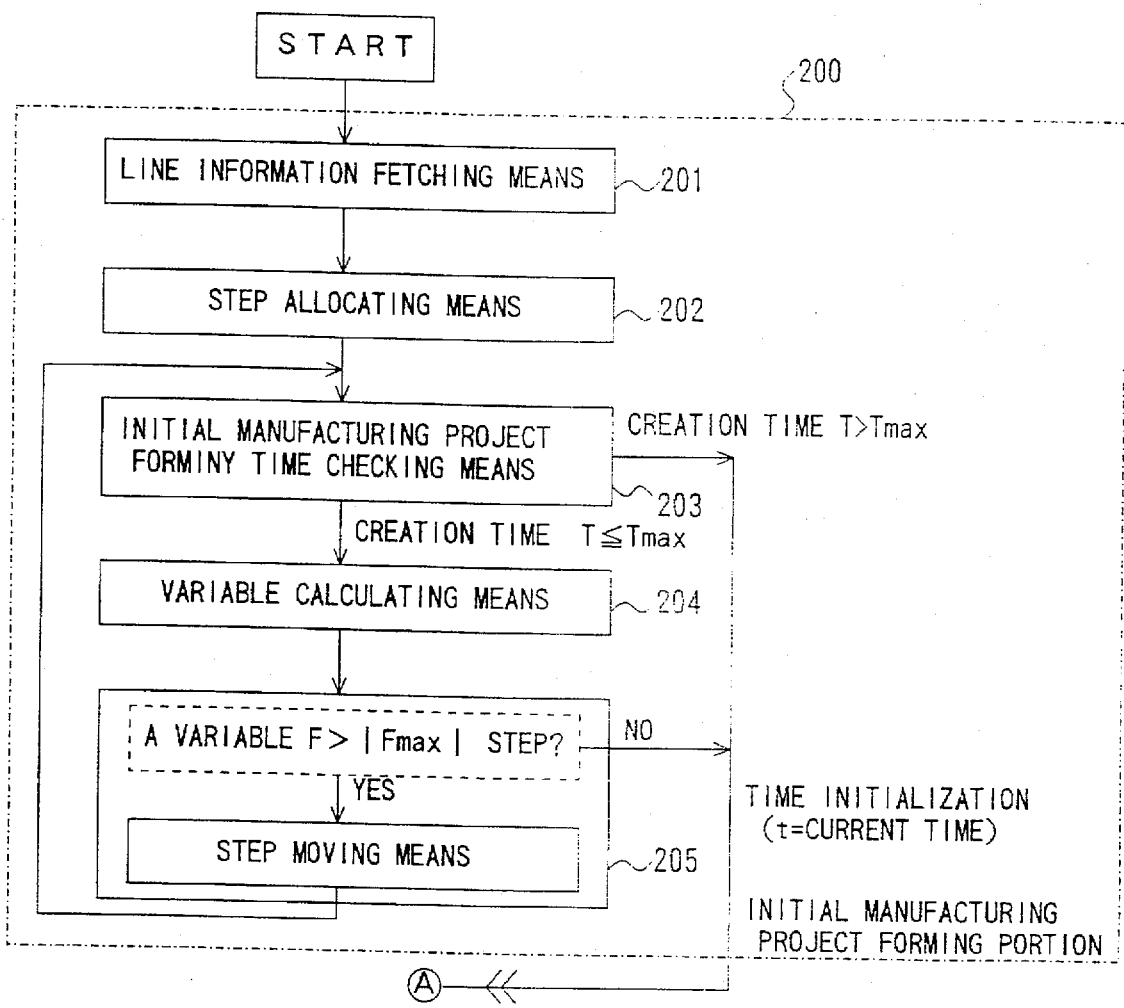
FIGS. 11(a), 11(b) are block diagrams showing the first device for forming a manufacturing project.
Figure 11B:
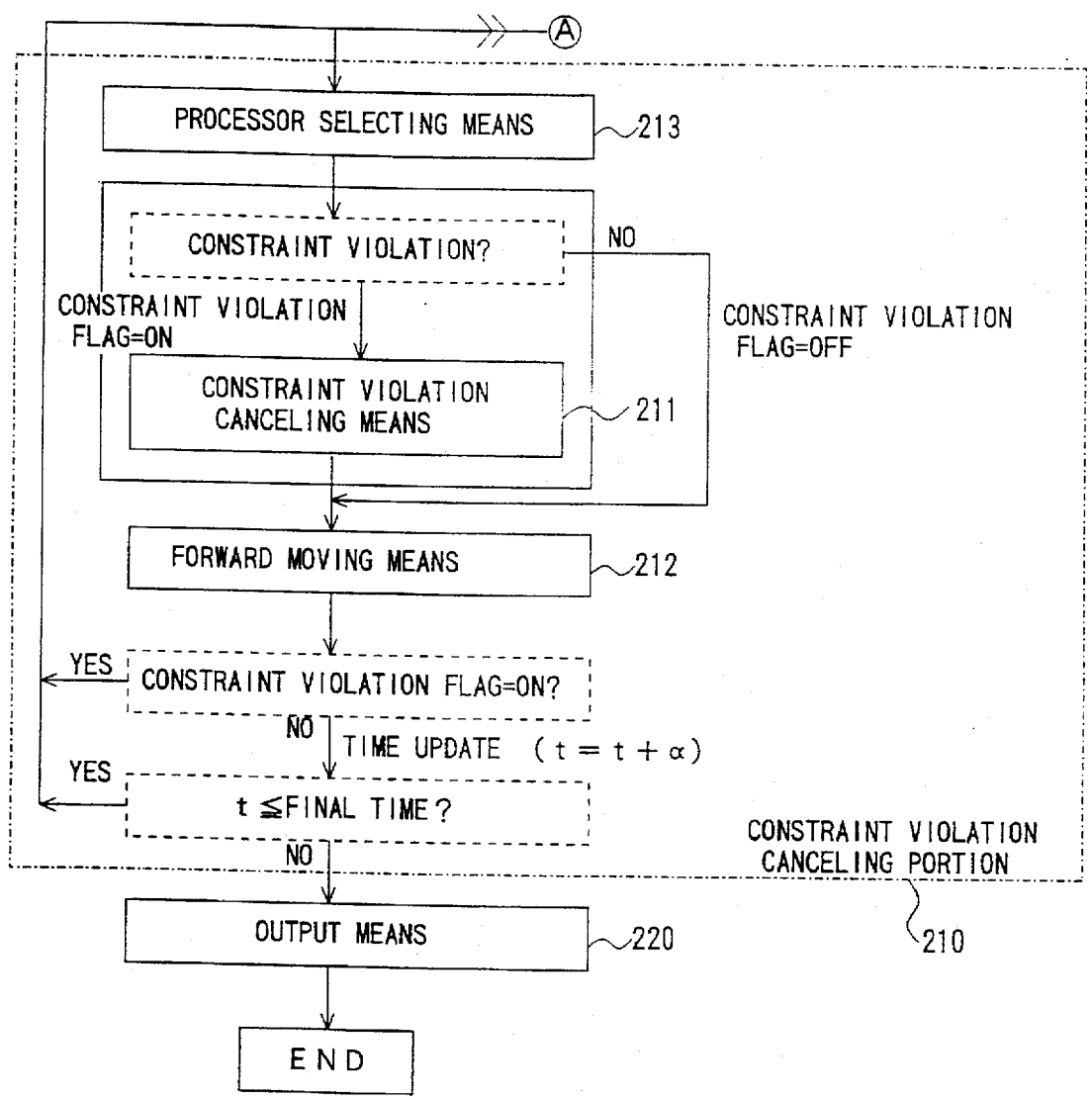

FIGS. 11(a), 11(b) are block diagrams showing the first device for forming a manufacturing project. The first device for forming a manufacturing project comprises an initial manufacturing project forming portion 200 for forming an initial manufacturing project, a constraint violation canceling portion 210 for canceling the constraint violations of the initial manufacturing project to create a manufacturing project, and output means 220 for outputting the manufacturing project. The initial manufacturing project forming portion 200 includes line information fetching means 201, step allocating means 202, initial manufacturing project forming time checking means 203, variable calculating means 204 and step moving means 205. The constraint violation canceling portion 210 includes constraint violation canceling means 211, forward moving means 212 and processor selecting means 213.

The operation of the initial manufacturing project forming portion 200 will be described below.

First of all, the operation information about a manufacturing apparatus on a manufacturing line, the beginning information about a product and the like are fetched into the device for forming a manufacturing project by the line information fetching means 201. The flow information about the product is stored in a flow information storage table shown in FIG. 12. The progress information about the product is stored in a progress information storage table shown in FIG. 13. The operation information about the manufacturing apparatus is stored in an apparatus operation information storage table shown in FIG. 14. The flow information about each product is stored in a manufacturing project storage table shown in FIG. 15. The step whose processing has already been started has a start segment set to "actual result". The step whose processing is not yet started has the start segment set to "project". The step whose processing has already been finished has a finish segment set to "actual result". The step whose processing is not yet finished has the finish segment set to "project".

The processing start and end times for the unprocessed steps are determined by the step allocating means 202. A method of determining the processing start and end times by the step allocating means 202 will be described below with reference to FIGS. 16, 8 and 15. FIG. 16 is a diagram for explaining the processing executed by the processing allocating means 202, wherein an axis of abscissa indicates a time. The average processing wait time of the average processing wait time storage table shown in FIG. 8 is the average of the wait time for each step which is obtained from the past processing results.

The step allocating means 202 retrieves a step P (a, n) having the start or finish segment of "project" from the manufacturing project storage table shown in FIG. 15, and retrieves the names of the step P (a, n) and the manufacturing apparatus, and the processing time from the flow information storage table shown in FIG. 12. Then, a record which has the same names of the step and apparatus as those of the record retrieved from the flow information storage table shown in FIG. 12 is retrieved from the average processing wait time storage table shown in FIG. 8. Thus, the average wait time Tave (a, n) for the step P (a, n) retrieved from the manufacturing project storage table shown in FIG. 15 is found.

Then, the processing start and end times Ts (a, n) and Te (a, n) for the step P (a, n) retrieved from the average processing wait time storage table shown in FIG. 8 are found by Equations (11) and (12), and stored in the manufacturing project storage table shown in FIG. 15.

$$Ts(a, n) = Te(a, n-1) + Tave(a, n) \quad (11)$$

$$Te(a,n) = Ts(a,n) + (\text{PROCESSING TIME FOR STEP } P(a, n)) \quad (12)$$

If there are a plurality of processors as in the first or third step of a product (1), an optimal processor, for example, a processor having the shortest average wait time (see FIG. 8) or a processor having the best yield is selected from the processors stored in the flow information storage table shown in FIG. 12. The average processing wait time for the selected processor is expressed by Tave (a, n).

The above operation is executed for all the steps whose start and finish segments of the manufacturing project storage table shown in FIG. 15 are set to "project" (see FIG. 16 (1)).

If the processing end time Te (a, N(a)) for the final step P (a, N(a)) is later than the target delivery date Tout (a), the processing wait time Tw1 (a, n) for each step is set to Tave (a, n)−{Te (a, N(a))−Tout (a)}/E(a) in order to correspond the day that the product is completed to the target delivery date (see FIG. 16 (2)).

The initial manufacturing project forming time checking means 203 decides whether a time T required from the line information fetching means 201 to the present time exceeds a preset constant Tmax or not. If the time T does not exceed the constant Tmax, the routine proceeds to the variable calculating means 204. If the time T exceeds the constant Tmax, the routine proceeds to the constraint violation canceling portion 210.

The variable calculating means 204 calculates the variable F (a, n) of each step P (a, n). The variable F (a, n) is found in the same manner as "variable calculation" of the method of forming a manufacturing project described above.

Figure 17:
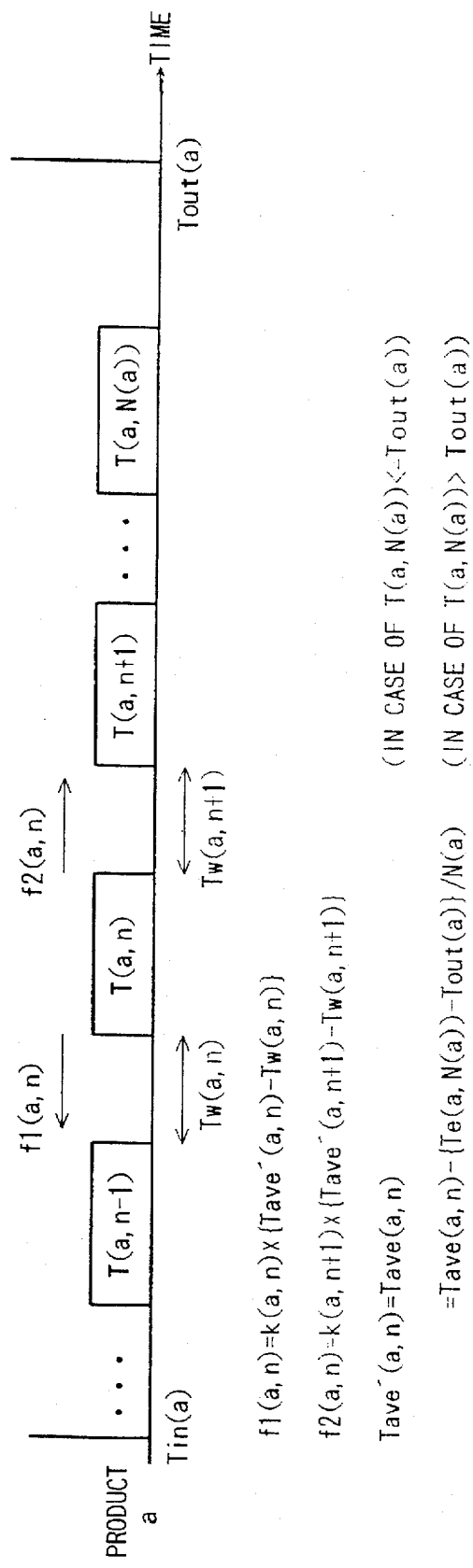
FIG. 17 is a diagram for explaining the processing of variable calculating means in the first and second devices for forming a manufacturing project.
Figure 18:
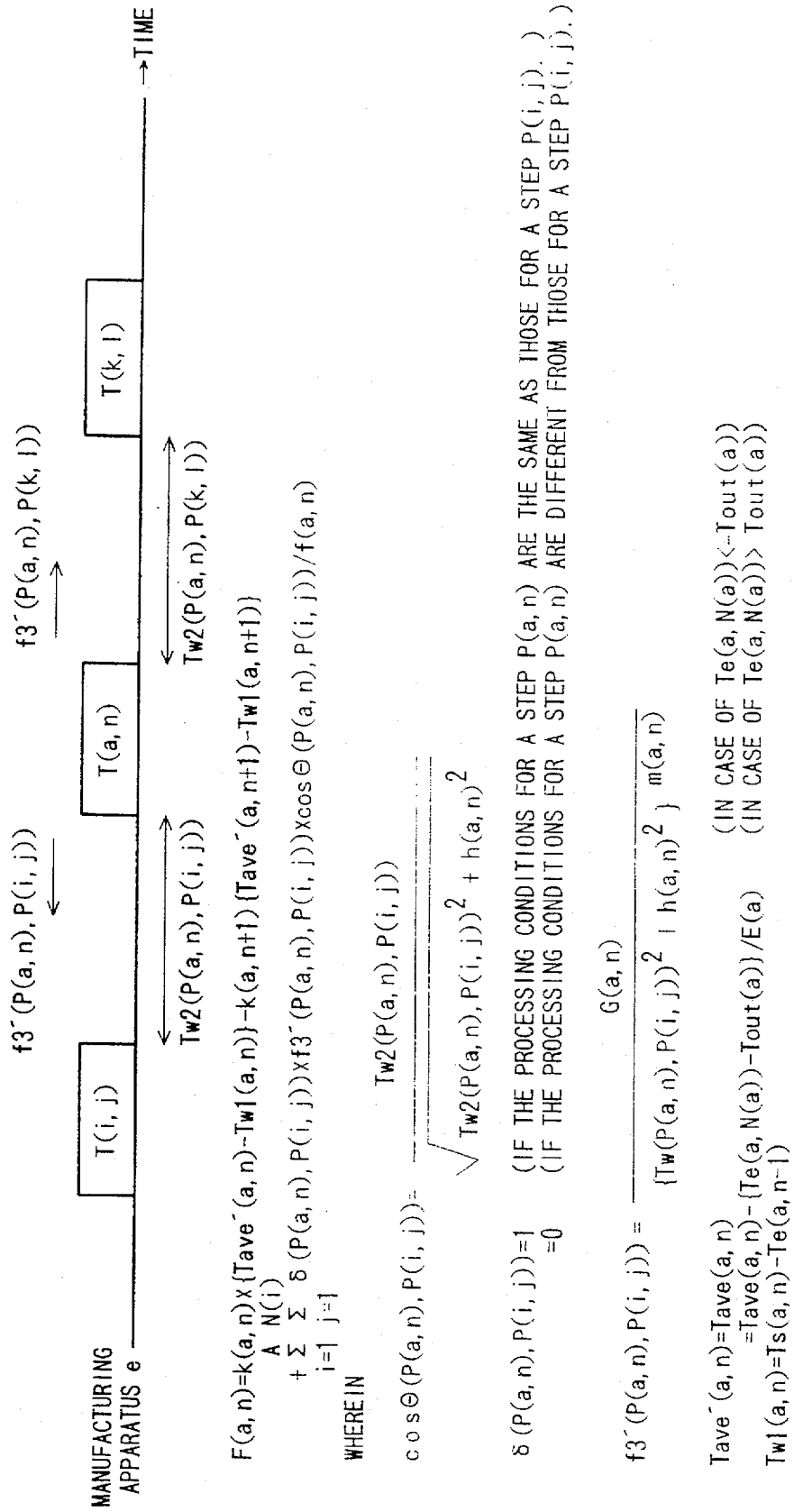
FIG. 18 is a diagram for explaining the processing of the variable calculating means in the first and second devices for forming a manufacturing project.
Figure 19:
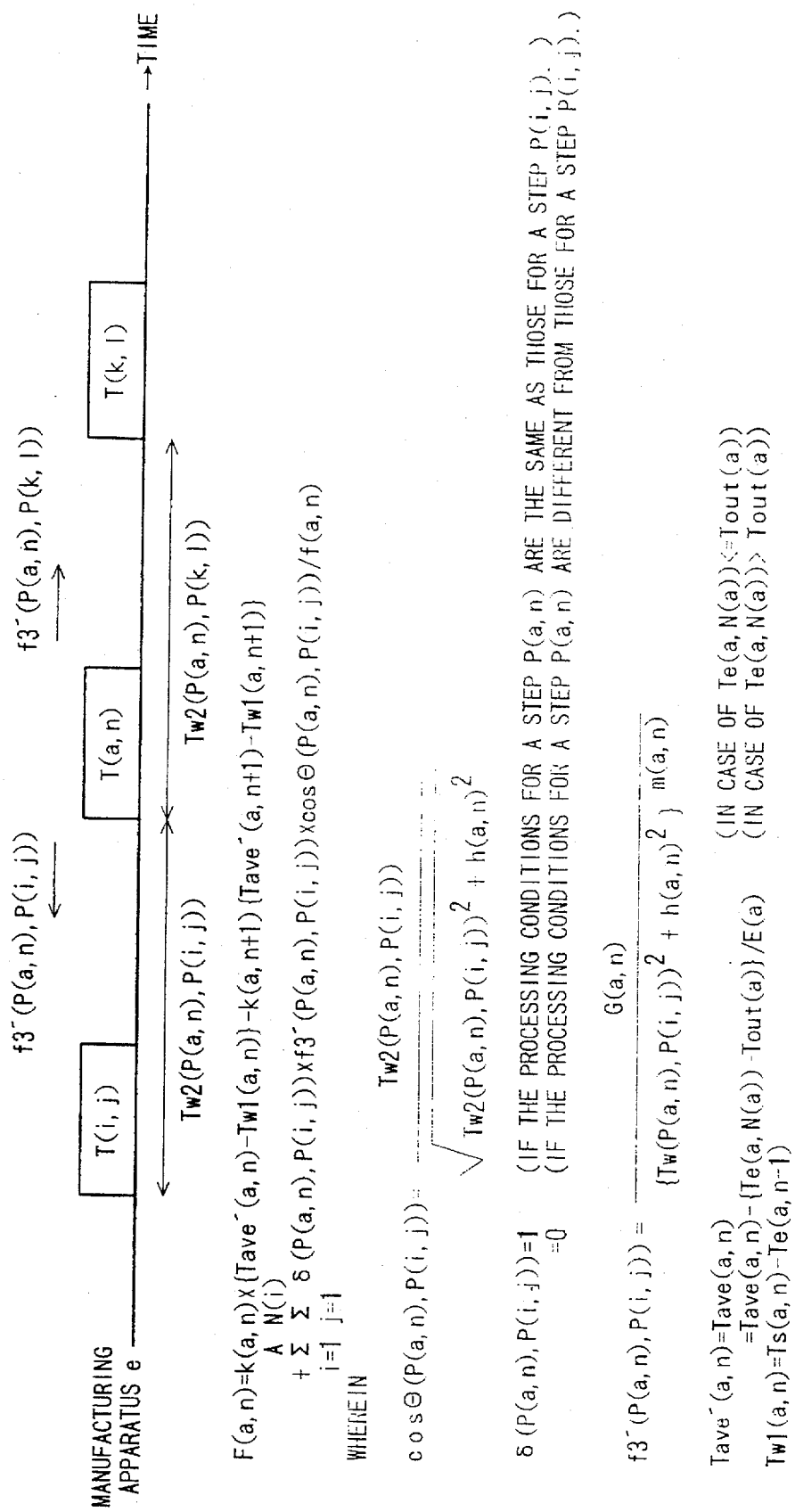
FIG. 19 is a diagram for explaining the processing of the variable calculating means in the first and second devices for forming a manufacturing project.

A method of calculating the variable F (a, n) by the variable calculating means 204 will be described below with reference to FIGS. 17, 18 and 19. FIG. 18 shows the case where a manufacturing apparatus e cannot perform the batch processing. FIG. 19 shows the case where the manufacturing apparatus e can perform the batch processing.

The records of unprocessed steps (having the start segment of "project") are retrieved one by one from the manufacturing project storage table shown in FIG. 15 so as to execute the following processing. The value of the prior steps of the same product, i.e., f1 (a, n)=k (a, n)×{Tave' (a, n)−Tw1 (a, n)}, and the value of the posterior steps, i.e., f2 (a, n)=k (a, n+1)×{Tave' (a, n+1)−Tw1 (a, n+1)} are calculated for the step P (a, n) retrieved from the manufacturing project storage table shown in FIG. 15 (see FIG. 17). When the number of steps of the product a is expressed by N (a) and the processing finish time for the final step P (a, N(a)) is expressed by Te (a, N(a)), Tave' (a, n) is defined as:

$$\begin{aligned} Tave'(a,n) &= Tave(a,n) & (\text{IN CASE OF } Te(a,N(a)) \le Tout(a)) \\ &= Tave(a,n) - & (\text{IN CASE OF } \\ & \{Te(a,N(a)) - & Te(a,N(a)) > Tout(a)) \\ & Tout(a)\}/E(a) \end{aligned} \quad (13)$$

The value f3 (a, n) of the step having the same contents of the processing as those of the step P (a, n) is found by Equation (14) (see FIGS. 18 and 19).

$$f3(a,n) = \sum_{i=1}^{A} \sum_{j=1}^{N(i)} \delta(P(a,n),P(i,j)) \times \quad (14)$$

$$f3'(P(a,n),P(i,j)) \times \cos\Theta(P(a,n),P(i,j))/f(a,n))$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

The meaning of Tw2 (P (a, n), P (i, j)) has been described above.

The variable F (a, n) is found with Equation 15 by f1 (a, n), f2 (a, n) and f3 (a, n) which are obtained in the above methods. The variable F (a, n) thus found is stored in a variable storage table shown in FIG. 20.

$$F(a, n) = f1 (a, n) - f2(a, n) + f3(a, n) \quad (15)$$

If there is a step in which the absolute value |F (a, n)| of the variable F (a, n) of the variable storage table shown in FIG. 20 is greater than the preset constant Fmax, the routine proceeds to the step moving means 205. If there is no step in which the absolute value |F (a, n)| of the variable F (a, n) of the variable storage table shown in FIG. 20 is greater than the preset constant Fmax, the routine proceeds to the constraint violation canceling portion 210.

The step moving means 205 retrieves a step in which the absolute value |F (a, n)| of the variable F (a, n) is the greatest. In case of |F (a, n)| Fmax, the following processing is executed to obtain the absolute values |F (a, n)| of the variables F (a, n) of all the steps which are smaller than Fmax.

If the variable F (a, n) of the retrieved step is greater than 0, the processing start and end times for the step P (a, n) are delayed by a unit time (for example, 1 min.) to calculate the variables of all the steps having the same contents of the processing as those of the steps P (a, n), P (a, n−1), P (a, n+1) and P (a, n). If the variable F (a, n) is smaller than 0, the processing start and end times for the step P (a, n) are moved forward by a unit time to recalculate the variables of all the steps having the same contents of the processing as those of the steps P (a, n), P (a, n−1), P (a, n+1) and P (a, n).

If the sign (positive or negative) of the valuable F (a, n) obtained by recalculation is not changed and the absolute value |F (a, n)| of the variable F (a, n) is smaller than that of the variable obtained before recalculation, the processing start and end times For the step P (a, n) are changed in the same manner as the foregoing.

The above operation is executed for a constant time or until the variables F a, n) of all the steps have the absolute values |F (a, n)| which are smaller than Fmax. Consequently, the processing start and end times of the manufacturing project storage table shown in FIG. 15 and the variable F (a, n) of the variable storage table shown in FIG. 20 are updated.

Then, the routine returns to the initial manufacturing project forming time checking means 203 to check the forming time. If the initial manufacturing project forming time checking means 203 checks the Forming time so that the routine proceeds to the variable calculating means 204, the variables F (a, n−1) and F (a, n+1) of the steps P (a, n−1) and P (a, n+1) provided before and after the step P (a, n) which is moved are recalculated. The (name of a step+name of an apparatus+processing conditions) of the step P (a, n) moved by the step moving means 205 are regarded as key. items to retrieve a step having the same contents of the processing as those of the step P (a, n) from the flow information storage table shown in FIG. 12. Then, the variable F (a, n) of the step thus retrieved is recalculated. After recalculating the variable F (a, n), the variable storage table shown in FIG. 20 is updated.

Each operation executed from the initial manufacturing project forming time checking means 203 till the step moving means 205 is continued as long as there is a step whose variable F (a, n) exceeds the constant Fmax.

The constraint violation canceling portion 210 cancels the constraint violations of the initial manufacturing project formed by the initial manufacturing project forming portion 200, and selects a processor which is used for each step. The operation of the constraint violation canceling portion 210 will be described below.

In the constraint violation canceling portion 210, the time t is initialized to a current time t0 and the routine proceeds to the processor selecting means 213.

The processor selecting means 213 selects an optimal processor from the processors used for the processing of each step. A method of selecting a processor by the processor selecting means 213 will be described below.

First of all, a step whose processing start time is equal to the time t (hereinafter referred to as P (a, n)) is retrieved. If a plurality of processors are registered with the step P (a, n) of the flow information storage table shown in FIG. 12, an apparatus evaluation function Fe (a, n) in Equation (16) is calculated. A processor having the smallest value is used for the step P (a, n).

$$F(a, n) = Ea \times E1 + Eb \times E2 \quad (16)$$

wherein Ea and Eb are constants. E1 is a time obtained from the apparatus operation information at which the processing of the step P (a, n) can be started. E2 is apparatus performance data which influences the yield on a product such as the number of dusts in an apparatus on a semiconductor manufacturing line, for example. As E2 has a smaller value, the apparatus performance is better. If the constants Ea and Eb are set to Ea>Eb≧0, a processor which has the yield decreased and the shorter processing wait time for the step P (a, n) is selected. If the constants Ea and Eb are set to 0=Ea<Eb, a processor which has the longer processing wait time for the step P (a, n) and can prevent the yield from decreasing is selected.

The constraint violation canceling means 211 retrieves, from the manufacturing project storage table shown in FIG. 15, a step having the processing start time which is equal to the time t. It is decided whether the retrieved step violates the constraint conditions of the constraint condition storage table shown FIG. 7 or not. If the retrieved step violates the constraint conditions of the constraint condition storage table shown in FIG. 7, a constraint violation flag is turned ON so that the routine proceeds to the forward moving means 212 to change the processing start and end times of the manufacturing project storage table shown in FIG. 15 so as to cancel the constraint violations. Thus, the manufacturing project storage table shown in FIG. 15 is updated. A method of canceling constraint violations is executed in the same manner as the constraint violation canceling step 102 of the method of forming a manufacturing project. If there is no constraint violation, the constraint violation flag is turned OFF so that the routine proceeds to the forward moving means 212 without updating the manufacturing project storage table shown in FIG. 15.

The forward moving means 212 changes the processing start and end times for the steps whose constraint violations are canceled by the constraint violation cancelling means 211 provided just before the forward moving means 212 and for the steps whose processings are being executed at the time t. The forward moving method executed by the forward moving means 212 will be described below with reference to FIG. 21.

First of all, an optional step P (a, n) is selected from the steps whose constraint violations are canceled by the constraint violation canceling means 211 and from the steps whose processings are being executed at the time t. A time Tn (a, n) which does not violate the constraint conditions of the constraint condition storage table shown in FIG. 7 is found. Then, the processing start and end times Ts (a, n) and Te (a, n) for the step P (a, n) are changed to update the manufacturing project storage table shown in FIG. 15 in such a manner that the processing start time Ts (a, n) for the step P (a, n) is changed to the time Tn (a, n). Thus, the processing of the forward moving means 212 is completed.

When the processing of the forward moving means 212 is completed, the routine returns to the constraint violation canceling means 211 if the constraint violation flag is ON. If the constraint violation flag is OFF, the time t is updated to (t+α) (wherein α is a unit time, for example, 1 min.). If the time t does not exceed the final time for the manufacturing project, the routine returns to the processor selecting means 213. If the time t exceeds the final time for the manufacturing project, the processing of the constraint violation canceling portion 210 is completed so that the routine proceeds to the output means 220.

The output means 220 displays, on a screen, the manufacturing project created by the initial manufacturing project forming portion 200 and the constraint violation canceling portion 210. Thus, the manufacturing project formation is completed.

When forming the initial manufacturing project by the initial manufacturing project forming portion 200, the constraint conditions are thoroughly ignored. Some of the constraint conditions may be considered to form the initial manufacturing project by the initial manufacturing project forming portion 200, which will be described below.

With reference to FIG. 22, there will be described an example in which the constraint condition that "Steps are not allocated for the down period of a manufacturing apparatus" and the constraint condition that "The processing of the step P (a, n) is executed after the processing off the prior step P (a, n−1) is completed, i.e., Ts (a, n)≧Te (a, n−1) is satisfied" are met to form the initial manufacturing project in the initial manufacturing project forming portion 200.

In the case where the processing of the seep P (a, n) is allocated for the down period of the manufacturing apparatus in the step allocating means 202, the processing start and end times Ts (a, n) arid Te (a, n) for the step P (a, n) are changed depending on either of the time Tds for apparatus down generation and the expected time Tde for apparatus down release to which the step P (a, n) is closer. If the step P (a, n) is closer to the time Tds for apparatus down generation, i.e., Ts (a, n)–Tds≦Tde–Te (a, n), the processing start and end times for the step P (a, n) are determined so as to obtain the processing start time expressed by Te (a, n)=Tds (see FIG. 22 (A) (1)). If the step P (a, n) is closer to the expected time Tde for apparatus down release, i.e., Ts (a, n)–Tds <Tde–Te (a, n), the processing start and end times for the step P (a, n) are determined so as to obtain the processing start time expressed by Ts (a, n)=Tde (see FIG. 22 (A) (2)).

The optimal processor is selected by the processor selecting means 213 in the Following manner. More specifically, a time E1 obtained from the apparatus operation information at which the processing can be started and an apparatus performance E2 which influences the yield on a product are regarded as evaluation items. The evaluation items are incorporated in the apparatus evaluation function Fe (a, n) to evaluate and select the processor. If there are other items necessary for the evaluation of the apparatus, Ec× (evaluation item) may be added on and after the third term of Equation (16).

The processing start and end times are continuously changed as long as the step P (a, n) violates the constraint condition that "Steps are not allocated for the down period of a manufacturing apparatus" In the step moving means 205 provided after the step allocating means 202, a step is allocated just before the apparatus down period during movement so as to form the initial manufacturing project (see FIG. 22(B)).

The manufacturing project is found by the method of forming a manufacturing project by means of the first device for forming a manufacturing project so that it possible to form a manufacturing project in which the delivery date can be observed, the processing wait time for each step can be prevented from increasing and the batch processing can be performed in a shorter time than in a device for forming a manufacturing project using the method of forming a manufacturing project which has the simulation base.

Figure 23A:
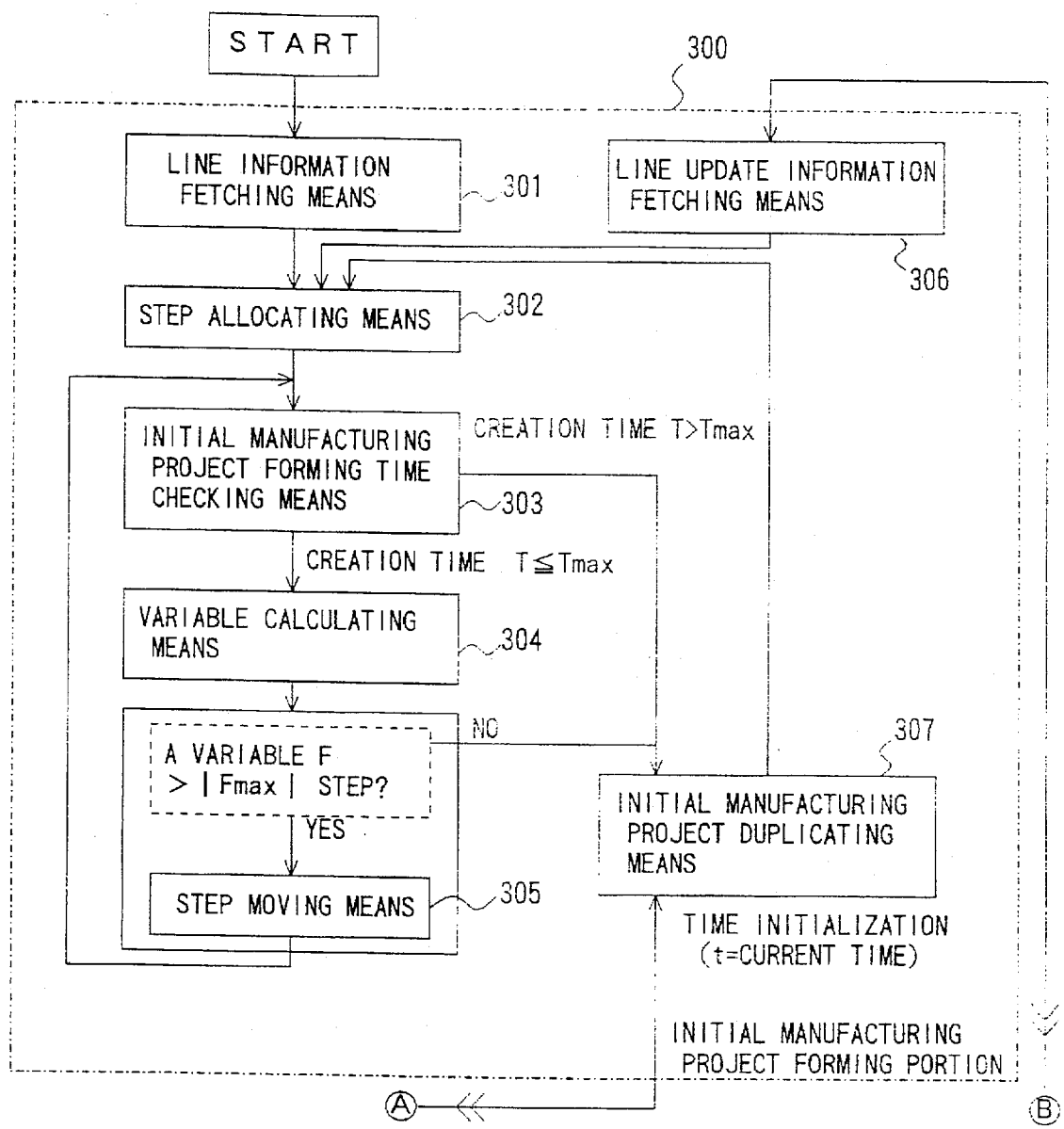
FIGS. 23(a), 23(b) are block diagrams showing the second device for forming a manufacturing project.
Figure 23B:
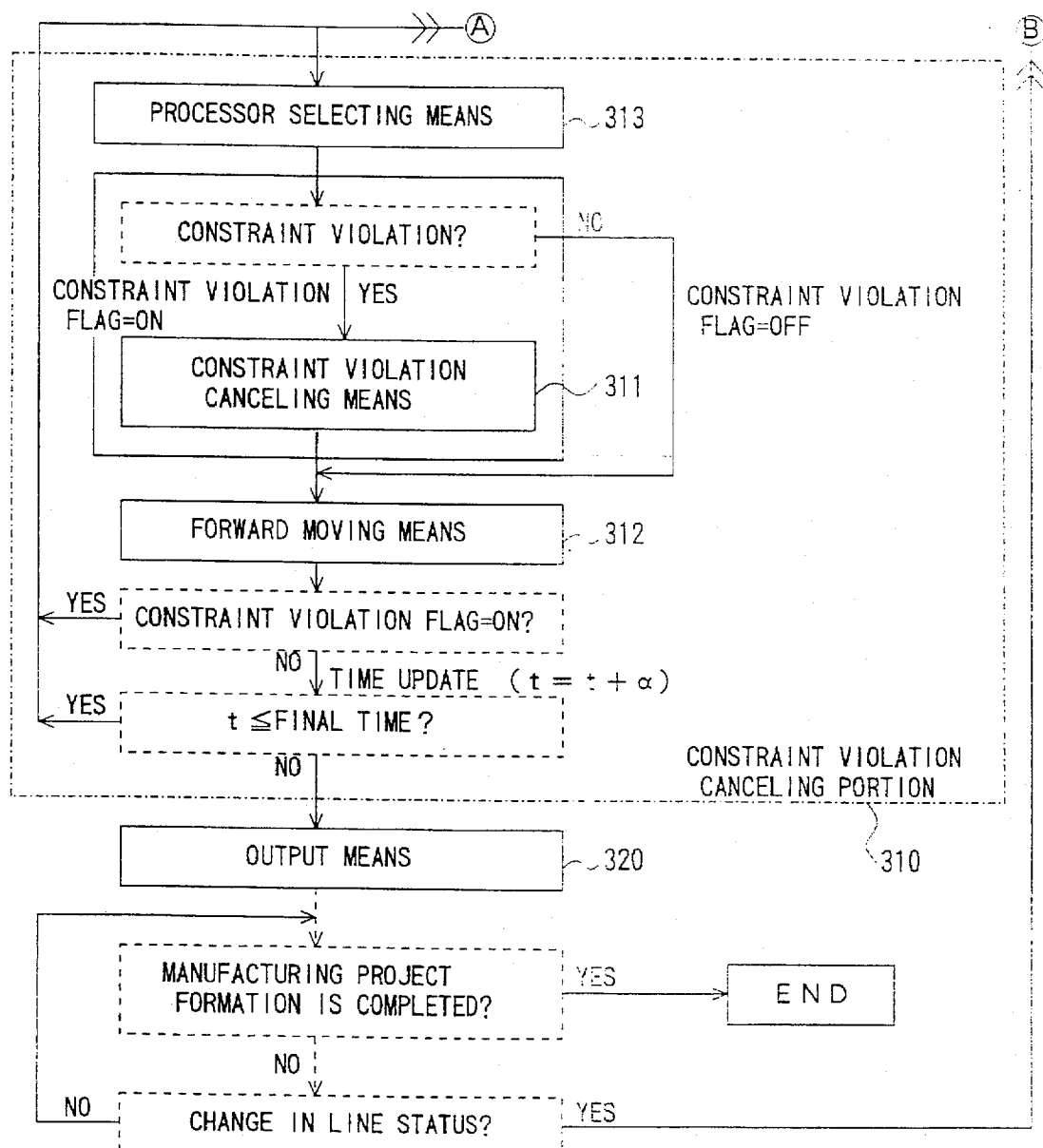

A second device for forming a manufacturing project according to the present invention will be described below with reference to the block diagram of FIGS. 23(a), 23(b).

The second device for forming a manufacturing project is obtained by adding, to the initial manufacturing project forming portion 200 of the first device for forming a manufacturing project, line update information fetching means 306 for fetching the change in the status of a manufacturing line and initial manufacturing project duplicating means 307 for copying the initial manufacturing project to get first and second initial manufacturing projects. According to the second device for forming a manufacturing project, the first initial manufacturing project created at the time of the last manufacturing project formation is corrected in an initial manufacturing project forming portion 300 and the constraint violations of the second initial manufacturing project are then canceled in a constraint violation canceling portion 310 to form the manufacturing project, so that the time necessary for the manufacturing project formation can be shortened and the apparatus down, the addition of novel products and the like can be instantaneously dealt with.

The function of line information fetching means 301 is the same as that of the line information fetching means 201 of the first device for forming a manufacturing project.

The line information fetching means 301 fetches the operation information about the manufacturing apparatus on the manufacturing line and the beginning information about the product in the second device for forming a manufacturing project, and stores the flow information about the product, the progress information about the product and the operation information about the manufacturing apparatus in the flow information storage table shown in FIG. 12, the progress information storage table shown in FIG. 13 and the apparatus operation information storage table shown in FIG. 14, respectively. The flow information about each product is stored in a first manufacturing project forming table shown in FIG. 24(a). The step whose processing has already been started has a start segment set to "actual result". The step whose processing is not yet started has the start segment set to "project". The step whose processing has already been finished has a finish segment set to "actual result". The step whose processing is not yet finished has the finish segment set to "project". When forming a new manufacturing project, all the data stored in a product update information storage table shown in FIG. 25 and an apparatus update information storage table shown in FIG. 26 are deleted and all the progress information about the product and all the operation information about the apparatus are registered. When correcting the manufacturing project which has been formed last time, all the data stored in the product update information storage table shown in FIG. 25 and the apparatus update information storage table shown in FIG. 26 are deleted to add only the apparatus operation information and the information about the product that is changed from the time at which the manufacturing project has been formed last time till the present time. If the product is newly put in the manufacturing line, the variable F (a, n) shown in the variable storage table of FIG. 20 is updated.

Then, the first initial manufacturing project is formed by step allocating means 302.

The processing of the step allocating means 302 in which the first initial manufacturing project is corrected will be described below.

For only the products stored in the product update information storage table shown in FIG. 25, the processing start and end times for each step of the first initial manufacturing project are updated. Referring to the change segment of the product update information storage table shown in FIG. 25, "processing wait" indicates that the processing of the prior step is finished and the current step waits for the processing, "product putting" indicates that the product has been newly put in the manufacturing line, and "pause setting" indicates that the processing of the current step is not executed till the time shown in the item of "time" by the manufacturing apparatus down or the like.

If the change segment is "processing wait", the finish segment of a step having the previous number to the step number of the relevant product is changed to "actual result".

If the change segment is "product putting", the product is registered in the same manner as the step allocating means 202 of the first device for forming a manufacturing project.

If the change segment is "pause setting", the processing start time for the relevant step is set to the time shown in the item of "time".

If there are a plurality of processors as in the first or third step of the product (1), an optimal processor, for example, a processor having the shortest average wait time (see FIG. 8) or a processor having the best yield is selected from the processors stored in the flow information storage table shown in FIG. 12. The average processing wait time of the selected processor is expressed by Tave (a, n).

When the processing of the step allocating means 302 is completed, initial manufacturing project forming time checking means 303 decides whether the time T required from the line information fetching means 301 to the present time exceeds a preset defined value Tmax. If the time T does not exceed the defined value Tmax, the routine proceeds to variable calculating means 304. If the time T exceeds the defined value Tmax, the routine proceeds to the initial manufacturing project duplicating means 307.

The variable calculating means 304 calculates the variable F (a, n) of each step P (a, n). First of all, one record is retrieved from the product update information storage table shown in FIG. 25. The variable F (a, n) of the step P (a, n) of the retrieved record is calculated. Then, the variables F (a, n−1) and F (a, n+1) of the steps P (a, n−1) and P (a, n+1) provided before and after the step P (a, n) are calculated. A method of calculating variables is the same as that of variable calculating means 204 of the first device for forming a manufacturing project. The above processing is executed for all the records of the product update information storage table shown in FIG. 25.

When the processing of the variable calculating means 304 is completed, the routine proceeds to step moving means 305. If there is no step whose variable F (a, n) is greater than a preset constant Fmax, the routine proceeds to the initial manufacturing project duplicating means 307. If there is/are a step or more whose variable(s) F (a, n) is/are greater than the constant Fmax, a step is retrieved to change the processing start and end times in such a manner that the variable F (a, n) is the smallest. Further, the processing start and end times of the first manufacturing project forming table shown in FIG. 24(a) and the variable F (a, n) of the variable storage table shown in FIG. 20 are updated. Then, the routine proceeds to the initial manufacturing project forming time checking means 303.

The initial manufacturing project duplicating means 307 duplicates, as the second manufacturing project forming table shown in FIG. 24(b), the first manufacturing project forming table shown in FIG. 24(a) which is created by the processings from the line information fetching means 301 to the step moving means 305 so as to create the first and second initial manufacturing projects.

When the processing of the initial manufacturing project duplicating means 307 is completed, the constraint violations of the second initial manufacturing project are canceled in the constraint violation canceling portion 310.

in the constraint violation canceling portion the time t is initialized to a current time t0 and the routine proceeds to processor selecting means 313.

The processor selecting means 313 selects an optimal processor from the processors used for the processing of each step. A method of selecting a processor by the processor selecting means 313 will be described below.

First of all, a step whose processing stare time is equal to the time t (hereinafter referred to as P (a, n)) is retrieved. If a plurality of processors are registered with the step P (a, n) of the flow information storage table shown in FIG. 12, an apparatus evaluation function Fe (a, n) in Equation (16) is calculated. A processor having the smallest value is used for the step P (a, n).

Wherein, Ea and Eb are constants. E1 is a time obtained from the apparatus operation information at which the processing of the step P (a, n) can be started. E2 is apparatus performance data which influences the yield on a product such as the number of dusts in an apparatus on a semiconductor manufacturing line, for example. As E2 has a smaller value, the apparatus performance is better. If the constants Ea and Eb are set to $Ea > Eb \geq 0$, a processor which has the yield decreased and the shorter processing wait time for the stop P (a, n) is selected. If the constants Ea and Eb are set to $0 \leq Ea < Eb$, a processor which has the longer processing wait time for the step P (a, n) and can prevent the yield from decreasing is selected.

A step whose processing start time is equal to the time t is retrieved from the second manufacturing project forming table shown in FIG. 24(b). It is decided whether the retrieved step violates the constraint conditions of the constraint condition storage table shown in FIG. 7 or not. If the retrieved step violates the constraint conditions of the constraint condition storage table shown in FIG. 7, the constraint violation flag is turned ON so that the routine proceeds to forward moving means 312 to change the processing start and end times of the second manufacturing project forming table shown in FIG. 24(b) so as to cancel the constraint violations. The method of canceling the constraint violations is executed in the same manner as the constraint violation canceling step 102 oF the method of forming a manufacturing project. If there is no constraint violation, the constraint violation flag is turned OFF so that the routine proceeds to the forward moving means 312.

The forward moving means 312 changes the processing start and end times for the steps whose constraint violations are canceled by constraint violation canceling means 311 provided just before the forward moving means 312 and for the steps whose processings are being executed at the time t.

The forward moving method executed by the forward moving means 312 will be described below with reference to FIG. 21.

First of all, an optional step P (a, n) is selected From the steps P (a, n) whose constraint violations are canceled by the constraint violation canceling means 311 and from the steps whose processings are being executed at the time t. A time Tn (a, n) which does not violate the constraint conditions of the constraint condition storage table shown in FIG. 7 is found. Then, the processing start and end times for the seep P (a, n) of the second manufacturing project forming table shown in FIG. 24(b) are changed and the manufacturing project storage table shown in FIG. 15 is updated in such a manner that the processing stare time Ts (a, n) for the step P (a, n) is changed to the time Tn (a, n). Thus, the processing of the forward moving means 312 is completed.

When the processing of the forward moving means 312 is completed, the routine returns to the constraint violation canceling means 811 if the constraint violation flag is ON. If the constraint violation flag is OFF, the time t is changed to $(t+\alpha)$ (wherein $\alpha$ is a unit time, for example, 1 min.). If the time t does not exceed the final time for the manufacturing project, the routine returns to the processor selecting means 818. If the time t exceeds the final time for the manufacturing project, the processing of the constraint violation canceling portion 310 is completed so that the routine proceeds to the output means 320.

The output means 320 displays, as a final manufacturing project on a screen, the second initial manufacturing project formed by the initial manufacturing project forming portion 300 and the constraint violation canceling portion 310.

If the products are newly put in the line or failures occur on the manufacturing apparatus after the second initial manufacturing project is output by the output means 320, the routine proceeds to the line update information fetching means 306 to fetch the operation information about the manufacturing apparatus on the manufacturing line or the beginning information about the product. Then, each processing described above is executed to form a new manufacturing project.

While the constraint conditions are thoroughly ignored in the initial manufacturing project forming portion 300 of the second device for forming a manufacturing project, some of the constraint conditions may be taken into consideration to form the initial manufacturing project.

According to the second device for forming a manufacturing project as described above, the initial manufacturing project duplicating means 307 is provided to correct the initial manufacturing project which has been formed last time and to form a manufacturing project. Consequently, it is possible to form the manufacturing project in a shorter time than in the first device for forming a manufacturing project.

While the first method of canceling constraint violations in the constraint violation canceling step of the method of forming a manufacturing project according to the present invention is used for the first and second devices for forming a manufacturing project, the second method of canceling constraint violations in the constraint violation canceling step of the method of forming a manufacturing project according to the present invention may be used.

The optimal processor is selected by the processor selecting means 313 in the following manner. More specifically, a time E1 obtained from the apparatus operation information at which the processing can be started and an apparatus performance E2 which influences the yield on a product are regarded as evaluation items. The evaluation items are incorporated in the apparatus evaluation function Fe (a, n) to evaluate and select the processor. If there are other items necessary for the evaluation of the apparatus, Ec × (evaluation item) may be added on and after the third term of Equation (16).

Figure 27:
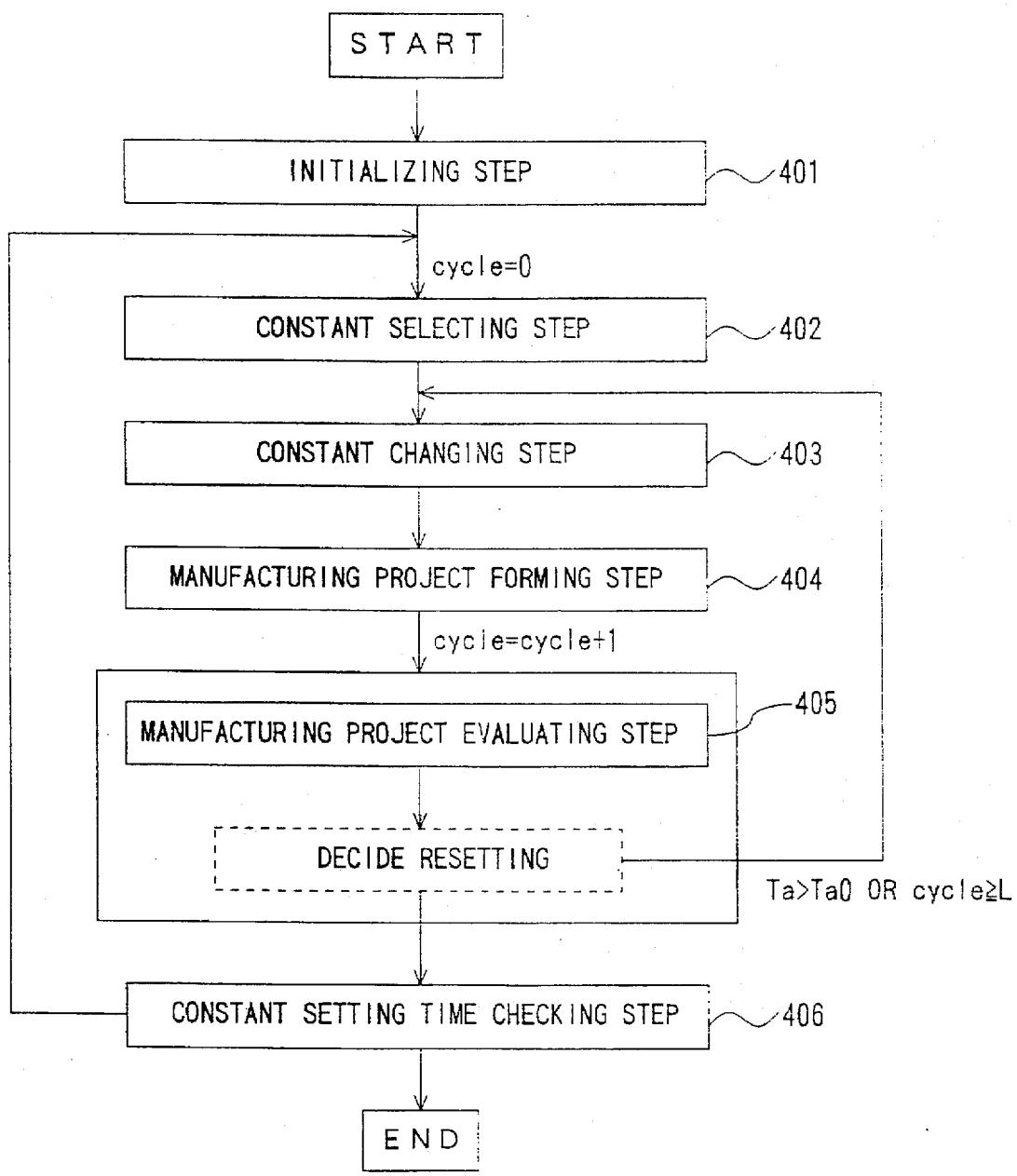
FIG. 27 is a diagram for explaining the processing of constant setting means in the first and second devices for forming a manufacturing project.
Figure 28:
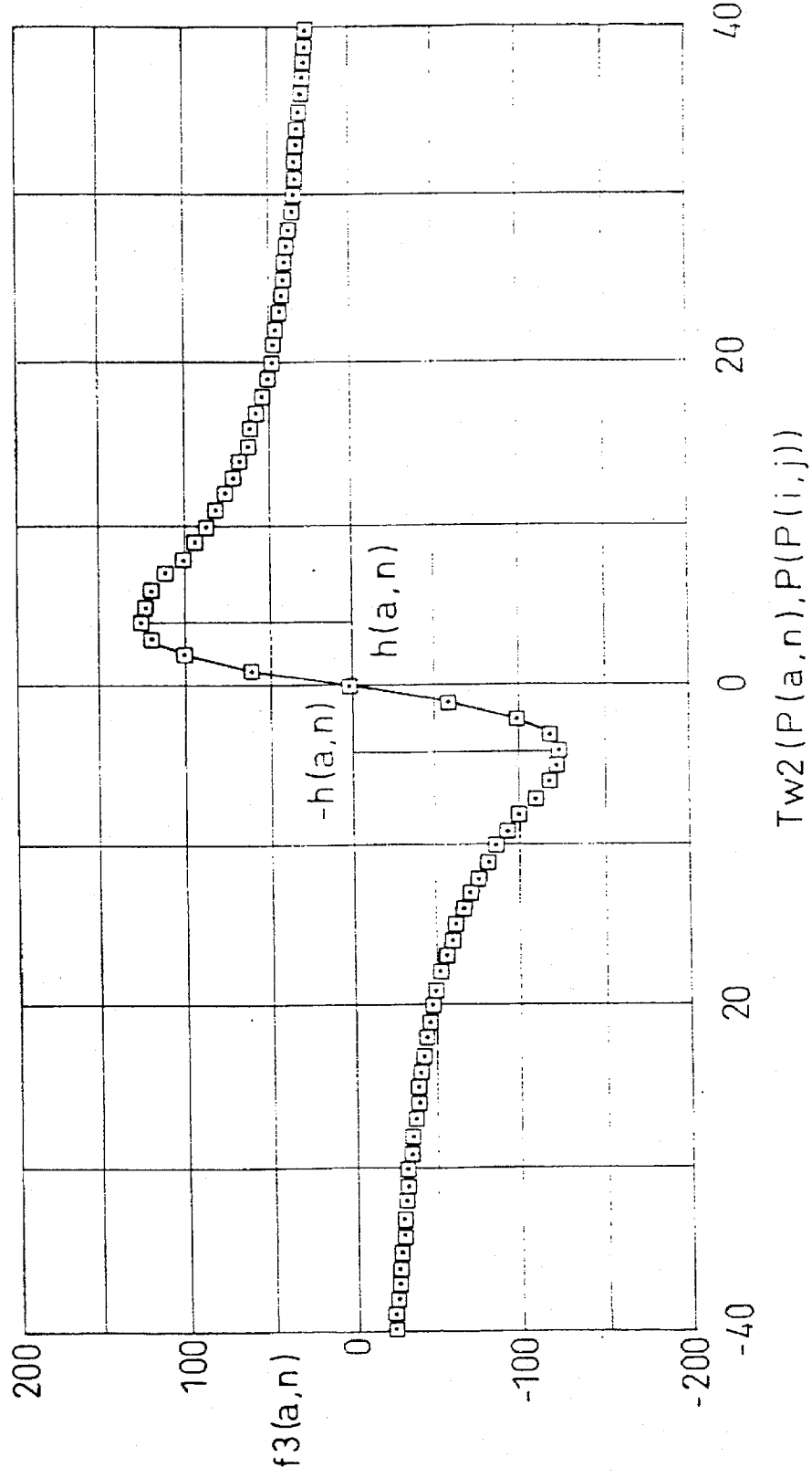
FIG. 28 is a graph showing an example off the third term of a variable F (a, n) in the first and second devices for forming a manufacturing project.
Figure 29:
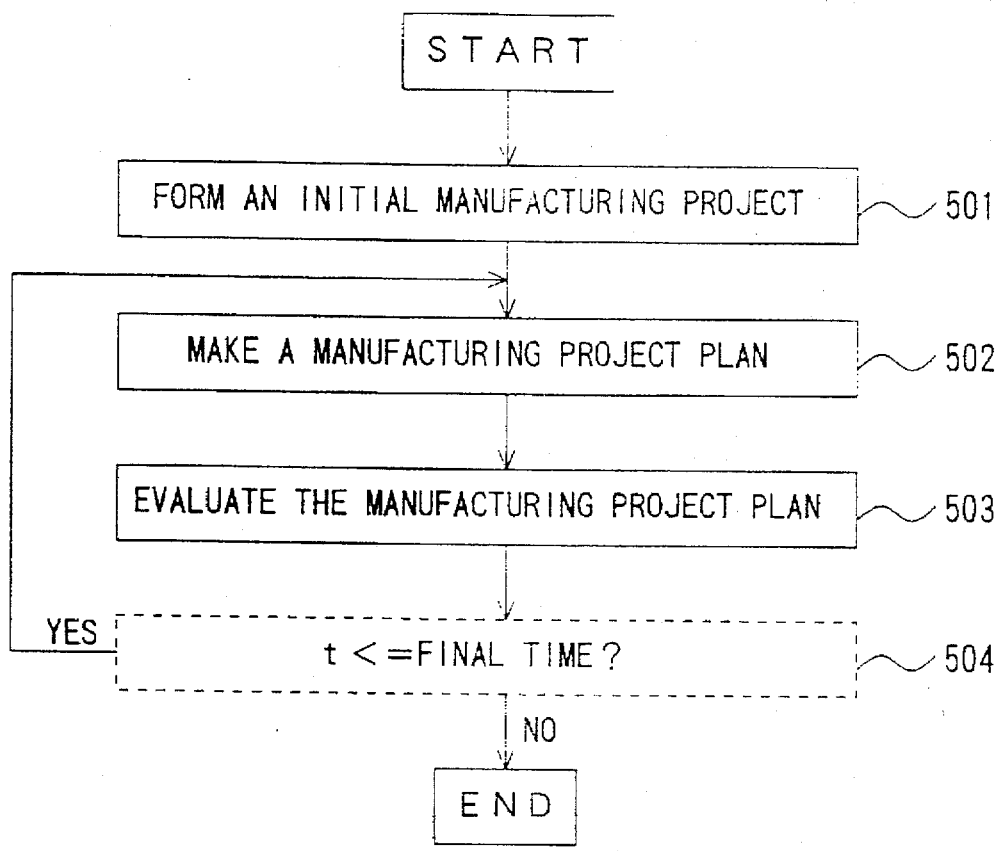
FIG. 29 is a flowchart showing a first method of forming a manufacturing project which makes use of the optimization technique according to the prior art.
Figure 30:
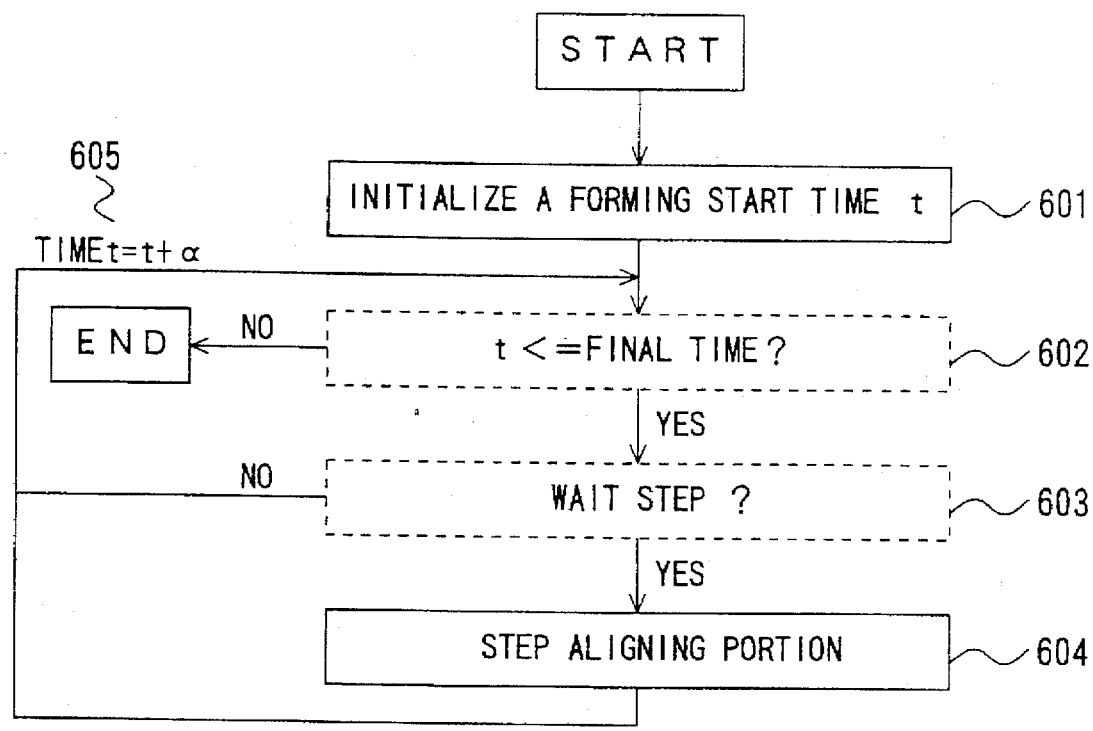
FIG. 30 is a flowchart showing a second method of forming a manufacturing project which has the simulation base according to the prior art.

With reference to the flowchart of FIG. 27, there will be described a method of setting constants k (a, n), m (a, n) and h (a, n) used for the first and second devices for forming a manufacturing project according to the present invention so as to decrease the objective function value of the manufacturing project by the optimization technique (which is the simulated annealing method in the present description).

In an initializing step 401, the constants k (a, n), m (a, n) and h (a, n) are initialized and the manufacturing project is formed by the initial manufacturing project forming portion 200 or 800 off the first or second device for forming a manufacturing project to find an objective function value C (0). Further, constants Ta0 (Ta0>1), Ta (Ta>Ta0), L (positive integer) and r (0<r<1) used in a manufacturing project evaluating step 405 are initialized.

In a constant selecting step 402, one of the constants k (a, n) and m (a, n) is selected randomly and stored in P (0) and P (1) to initialize a variable "cycle" to 0.

In a constant changing step 403, the constant P (1) is changed to a value in the vicinity of the constant P (0).

In a manufacturing project forming step 404, the manufacturing project is Formed by means of the first or second device for forming a manufacturing project.

In the manufacturing project evaluating step 405, the variable "cycle" is changed to "cycle+1" to find the objective function value C (1) of the manufacturing project formed in the manufacturing project forming step 404. Then, the objective function value C (1) is compared with the objective function value C (0) found in the initializing step 401. In case of C (1)≦C (0), P (0) and C (1) are changed to P (1) and C (0) respectively. In case of C (1)>C (0), P (0) is changed to P (1) based on a probability of (e−(C(1)+C(0))). Then, Ta is set to (r×Ta) wherein Ta is a positive real number.

In case of Ta≦Ta0 and "cycle"<L, the routine proceeds to a constant setting time checking step 406. In case of Ta>Ta0 or "cycle"≧ L, the routine returns to the constant changing step 403.

In the constant setting time checking step 406, the routine returns to the constant selecting step 402 if the time required from the start of the initializing step 401 is smaller than T, and the process of setting constants is completed if the time required from the start of the initializing step 401 is equal to or greater than T.

The constants used for the first or second device for forming a manufacturing project are set by the constant setting method described above, so that it is possible to form the manufacturing project in which TAT is shortened.

While the simulated annealing method has been used to describe the constant setting method, other optimization technique can be utilized.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A method of forming a manufacturing project for a product which is put in a manufacturing line comprising;

an initial manufacturing project forming step of setting, on all manufacturing steps, a variable F (a, n) defined by Equation (1):

$$F(a,n) = k(a,n) \times \{Tave'(a,n) - Tw1(a,n)\} - \{Tave'(a,n+1) - Tw1(a,n+1)\}$$

WHEREIN

| | | |
|---|---|---|
| $Tave'(a,n)$ | $= Tave(a,n)$ | (IN CASE OF $Te(a,N(a)) <= Tout(a)$) |
| | $= Tave(a,n) - \{Te(a,N(a)) - Tout(a)\}/E(a)$ | (IN CASE OF $Te(a,N(a)) > Tout(a)$) | wherein k (a, n) is a constant set on a step P (a, n) which is the nth step of a product a, Tave (a, n) is an average wait time for the same step as the step P (a, n) which is obtained from the past processing results, Tw1 (a, n) is a processing wait time which is a time difference between a processing end time for a step P (a, n−1) and a processing start time for the step P (a, n), N (a) is a final step for the product a, Te (a, N(a)) is a finish time for a final step P (a, N(a)), Tout (a) is a target delivery date for the product a, and E (a) is the number of steps in which the product a is not yet processed, and then determining the processing start and end times for each step in such a manner that the absolute value of the variable F (a, n) is smaller than a preset constant Fmax which is equal to or greater than 0 so that an initial manufacturing project is formed, and a constraint condition canceling step for correcting the initial manufacturing project formed in the initial manufacturing project forming step in such a manner that the initial manufacturing project does not violate preset constraint conditions.

2. A method of forming a manufacturing project for a product which is put in a manufacturing line comprising;

an initial manufacturing project forming step of setting, on all manufacturing steps, a variable F (a, n) defined by Equation (2):

$$F(a,n) = \sum_{i=1}^{A} \sum_{j=1}^{N(i)} \delta(P(a,n), P(i,j)) \times f3'(P(a,n), P(i,j)) \times$$

$$\cos\Theta(P(a,n), P(i,j))/f(a,n)$$

WHEREIN $$\cos\Theta(P(a,n), P(i,j)) = \frac{Tw2(P(a,n), P(i,j))}{\sqrt{Tw2(P(a,n), P(i,j))^2 + h(a,n)^2}}$$

$$f3'(P(a,n), P(i,j)) = \frac{G(a,n)}{\{Tw(P(a,n), P(i,j))^2 + h(a,n)^2\}^{m(a,n)}}$$

wherein A is the number of products, N (i) is the number of steps for a product i, G (a, n), h (a, n) and m (a, n) are constants which are common in steps having the same contents of the processing as those of the step P (a, n) which is the nth step of a product a, Tw2 (P (a, n), P (i, j)) is a time difference between a processing start time for the step P (a, n) and the processing start time for a step P (i, j) if a manufacturing apparatus for executing the processing of the step P (a, n) can perform the batch processing, Tw2 (P (a, n), P (i, j)) is a time difference between a processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), or Tw2 (P (a, n), P (i, j)) is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions for the step P (a, n) are the same as those for the step P (i, j), and has a value of 0 if the processing conditions for the step P (a, n) are different from those for the step P (i, j), f (a, n) is a constant or a function which increases as the number of steps having the same processing conditions as those for the step P (a, n) increases, and then determining the processing start and end times for each step in such a manner that the absolute value of the variable F (a, n) is smaller than a preset constant Fmax which is equal to or greater than 0 so that an initial manufacturing project is formed, and a constraint condition canceling step for correcting the initial manufacturing project formed in the initial manufacturing project forming step in such a manner that the initial manufacturing project does not violate preset constraint conditions.

3. A method of forming a manufacturing project for a product which is put in a manufacturing line comprising;

an initial manufacturing project forming step of setting, on all manufacturing steps, a variable F (a, n) defined by Equation (3):

$$F(a,n) = k(a,n) \times \{Tave'(a,n) - Tw1(a,n)\} - \{Tave'(a,n+1) -$$

$$Tw1(a,n+1)\} + \sum_{i=1}^{A} \sum_{j=1}^{N(i)} \delta(P(a,n), P(i,j)) \times f3'(P(a,n), P(i,j)) \times$$

$$\cos\Theta(P(a,n), P(i,j))/f(a,n)$$

-continued

WHEREIN $$\cos\Theta(P(a,n), P(i,j)) = \frac{Tw2(P(a,n), P(i,j))}{\sqrt{Tw2(P(a,n), P(i,j))^2 + h(a,n)^2}}$$

$$f3'(P(a,n), P(i,j)) = \frac{G(a,n)}{\{Tw(P(a,n), P(i,j))^2 + h(a,n)^2\}^{m(a,n)}}$$

$$Tave'(a,n) = Tave(a,n) \quad \text{(IN CASE OF } Te(a,N(a)) <= Tout(a))$$

$$= Tave(a,n) - \{Te(a,N(a)) - Tout(a)\}/E(a) \quad \text{(IN CASE OF } Te(a,N(a)) > Tout(a))$$

wherein k (a, n) is a constant set on a step P (a, n) which ts the nth step of a product a, Tave (a, n) is an average wait time for the same seep as the step P (a, n) which is obtained from the past processing results, Tw1 (a, n) is a processing wait time which is a time difference between a processing end time for a step P (a, n−1) and a processing start time for the step P (a, n), A is the number of products, N (i) is the number of steps for a product i, G (a, n), h (a, n) and m (a, n) are constants which are common in steps having the same contents of the processing as those of the step P (a, n), Tw2 (P (a, n), P (i, j)) is a time difference between the processing start time for the step P (a, n) and the processing start time for a step P (i, j) if a manufacturing apparatus for executing the processing of the step P (a, n) can perform the batch processing, Tw2 (P (a, n), P (i, j)) is a time difference between the processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), or Tw2 (P (a, n), P (i, j)) is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions For the step P (a, n) are the same as those for the step P (i, j), and has a value of 0 if the processing conditions for the step P (a, n) are different from those for the step P (i, j), f (a, n) is a constant or a function which increases as the number of steps having the same processing conditions as those for the step P (a, n) increases, Te (a, N(a)) is a finish time for a final step P (a, N(a)), Tout (a) is a target delivery date for the product a, and E (a) is the number of steps in which the product a is not yet processed, and then determining the processing start and end times for each step in such a manner that the absolute value of the variable F (a, n) is smaller than a preset constant Fmax which is equal to or greater than 0 so that an initial manufacturing project is formed, and a constraint condition canceling step for correcting the initial manufacturing project formed in the initial manufacturing project forming step in such a manner that the initial manufacturing project does not violate preset constraint conditions.

4. A device for forming a manufacturing project comprising;

line information fetching means for fetching line information such as the operation information about a manufacturing apparatus on a manufacturing line, the beginning information about a product and the like, step allocating means for calculating processing start and end times Ts (a, n) and Te (a, n) for the unprocessed steps out of the step P (a, n) as the nth step of a product a based on the line information fetched by the line information fetching means with Equation (4):

$$Ts(a,n) = Te(a,n-1) + Tave(a,n) \quad \text{(IN CASE OF } Te(a,N(a)) <= Tout(a))$$
$$= Te(a,n-1) + Tave(a,n) - \quad \text{(IN CASE OF }$$
$$\{Te(a,N(a)) - Tout(a)\}/E(a) \quad Te(a,N(a)) > Tout(a))$$

$$Te(a,n) = Ts(a,n) + T(a,n)$$

wherein Tave (a, n) is an average wait time for the same step as the step P (a, n) which is obtained from the past processing results, N (a) is a final step for the product a, Te (a, N(a)) is a finish time for a final step P (a, N(a)), Tout (a) is a target delivery date for the product a, E (a) is the number of steps in which the product a is not yet processed, and T (a, n) is a processing time for the nth step of the product a, variable calculating means for calculating each variable F (a, n) of the unprocessed steps by Equation (5):

$$F(a,n) = k(a,n) \times \{Tave'(a,n) - Tw1(a,n)\} - \{Tave'(a,n+1) -$$

$$Tw1(a,n+1)\} + \sum_{i=1}^{A} \sum_{j=1}^{N(i)} \delta(P(a,n),P(i,j)) \times f3'(P(a,n),P(i,j)) \times$$

$$\cos\Theta(P(a,n),P(i,j))/f(a,n)$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

$$Tave'(a,n) = Tave(a,n) \quad \text{(IN CASE OF } Te(a,N(a)) <= Tout(a))$$
$$= Tave(a,n) - \{Te(a,N(a)) - \quad \text{(IN CASE OF }$$
$$Tout(a)\}/E(a) \quad Te(a,N(a)) > Tout(a))$$

$$Tw1(a,n) = Ts(a,n) - Te(a,n-1)$$

wherein k (a, n) is a constant set on the step P (a, n), Tave (a, n) is an average wait time for the same step as the step P (a, n) which is obtained from the past processing results, Tw1 (a, n) is a processing wait time which is a time difference between the processing end time for a step P (a, n−1) and the processing start time for the step P (a, n), A is the number of products, N (i) is the number of steps for a product i, G (a, n), h (a, n) and m (a, n) are constants which are common in steps having the same contents of the processing as those of the step P (a, n), Tw2 (P (a, n), P (i, j)) is a time difference between the processing start time for the step P (a, n) and the processing start time for a step P (i, j) if a manufacturing apparatus for executing the processing of the step P (a, n) can perform the batch processing, Tw2 (P (a, n), P (i, j)) is a time difference between the processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), or Tw2 (P (a, n), P (i, j)) is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value of 1 if the processing conditions for the step P (a, n) are the same as those for the step P (i, j), and has a value of 0 if the processing conditions For the step P (a, n) are different from those for the step P (i, j), f (a, n) is a constant or a function which increases as the number of steps having the same processing conditions as those for the step P (a, n) increases, Te (a, N(a)) is a finish time for a final step P (a, N(a)), Tout (a) is a target delivery date for the product a, and E (a) is the number of steps in which the product a is not yet processed, step moving means for changing the processing start and end times Ts (a, n) and Te (a, n) in such a manner that the processing of each step is started at the time when the variable F (a, n) is equal to or smaller than a preset constant Fmax sequentially from a step having the greatest absolute value of the variable F (a, n) obtained by the variable calculating means so that an initial manufacturing project is created, and constraint condition canceling means for correcting the initial manufacturing project created by the step moving means in such a manner that the initial manufacturing project does not violate preset constraint conditions so that the manufacturing project is formed.

5. The device according to claim 4, further comprising forward moving means for moving forward the processing start and end times Ts (a, n) and Te (a, n) for each manufacturing step of the manufacturing project formed by the constraint condition canceling means within the range in which the manufacturing project does not violate the constraint conditions.

6. The device according to claim 4, further comprising initial manufacturing project forming time checking means for deciding whether the variable F (a, n) should be calculated again by the variable calculating means or not after the step allocating means finds the variable F (a, n), causing the variable calculating means to calculate the variable F (a, n) again, then causing the step moving means to change again the processing start and finish times Ts (a, n) and Te (a, n) so as to start the processing at the time when the variable F (a, n) calculated again is equal to or smaller than a preset constant Fmax so that the initial manufacturing project is created if the initial manufacturing project forming time checking means decides that the variable F (a, n) should be calculated again, and causing the constraint condition canceling means to correct the initial manufacturing project created by the step allocating means in such a manner that the initial manufacturing project does not violate preset constraint conditions so that the manufacturing project is formed if the initial manufacturing project forming time checking means decides that the variable F (a, n) should not be calculated again.

7. The device according to claim 4, further comprising means for moving the nth step of a product a before or after the down period of a processor for executing the processing of the nth step of the product a if the processor is in the down state for a processing period defined by the processing start and end times Ts (a, n and Te (a, n) obtained by the step allocating means.

8. The device according to claim 4, further comprising;
constant setting means having initializing means for setting constants k (a, n), m (a, n) and h (a, n) in Equation (5) to optional initial-values, constant selecting means for selecting other values which are different from the initial-values, and constant changing means for changing the constants k (a, n), m (a, n) and h (a, n) from the initial-values to the other values so as to set the changed values, manufacturing project evaluating means for evaluating the validity of the manufacturing project formed by the constraint condition canceling means, and constant setting time checking means for deciding whether a time for the processing executed by the constant setting means is within the range of a preset constant setting time, causing the constant setting means to continue the processing if the time for the processing is shorter than the constant setting time, and causing the constant setting means to complete the processing if the time for the processing is equal to or longer than the constant setting time, wherein the variable calculating means has the function of calculating the variable F (a, n) with Equation (5) based on the initial value set by the initializing means and the changed value set by the constant changing means.

9. The device according to claim 4, further comprising processor selecting means for selecting a processor which is the most suitable for the processing of each step if there are a plurality of processors used for the processing of each step.

10. A device for forming a manufacturing project comprising;

line information fetching means for fetching line information such as the operation information about a manufacturing apparatus on a manufacturing line, the beginning information about a product and the like, line update information fetching means for fetching the updated line information if any, step allocating means for calculating processing start and end times Ts (a, n) and Te (a, n) for the unprocessed steps out of the step P (a, n) as the nth step of a product a based on the line information fetched by the line information fetching means with Equation (6):

$$Ts(a,n) = Te(a,n-1) + Tave(a,n) \quad \text{(IN CASE OF } Te(a,N(a)) \leq Tout(a)\text{)}$$
$$= Te(a,n-1) + Tave(a,n) - \{Te(a,N(a)) - Tout(a)\}/E(a) \quad \text{(IN CASE OF } Te(a,N(a)) > Tout(a)\text{)}$$
$$Te(a,n) = Ts(a,n) + T(a,n)$$

wherein Tave (a, n) is an average wait time for the same step as the step P (a, n) which is obtained from the past processing results, N (a) is a final step for the product a, Te (a, N(a)) is a finish time for a final step P (a, N(a)), Tout (a) is a target delivery date for the product a, E (a) is the number of steps in which the product a is not yet processed, and T (a, n) is a processing time for the nth step of the product a, variable calculating means for calculating each variable F (a, n) of the unprocessed manufacturing steps by Equation (7):

$$F(a,n) = k(a,n) \times \{Tave'(a,n) - Tw1(a,n)\} - \{Tave'(a,n+1) - Tw1(a,n+1)\} + \sum_{i=1}^{A} \sum_{j=1}^{N(i)} \delta(P(a,n),P(i,j)) \times f3'(P(a,n),P(i,j)) \times \cos\Theta(P(a,n),P(i,j))/f(a,n)$$

WHEREIN $$\cos\Theta(P(a,n),P(i,j)) = \frac{Tw2(P(a,n),P(i,j))}{\sqrt{Tw2(P(a,n),P(i,j))^2 + h(a,n)^2}}$$

$$f3'(P(a,n),P(i,j)) = \frac{G(a,n)}{\{Tw(P(a,n),P(i,j))^2 + h(a,n)^2\}^{m(a,n)}}$$

-continued
$$Tave'(a,n) = Tave(a,n) \quad \text{(IN CASE OF } Te(a,N(a)) \leq Tout(a)\text{)}$$
$$= Tave(a,n) - \{Te(a,N(a)) - Tout(a)\}/E(a) \quad \text{(IN CASE OF } Te(a,N(a)) > Tout(a)\text{)}$$
$$Tw1(a,n) = Ts(a,n) - Te(a,n-1)$$

wherein k (a, n) is a constant set on the step P (a, n), Tw1 (a, n) is a processing wait time which is a time difference between the processing end time for a step P (a, n−1) and the processing start time for the step P (a, n), A is the number of products, N (i) is the number of steps for a product i, G (a, n), h (a, n) and m (a, n) are constants which are common in steps having the same contents of the processing as those of the step P (a, n), Tw2 (P (a, n), F (i, j)) is a time difference between the processing start time for the step P (a, n) and the processing start time for a step P (i, j) if a manufacturing apparatus for executing the processing of the step P (a, n) can perform the batch processing, Tw2 (P (a, n)), P (i, j)) is a time difference between the processing end time for the step P (a, n) and the processing start time for the step P (i, j) if the manufacturing apparatus for executing the processing of the step P (a, n) cannot perform the batch processing and the processing start time for the step P (a, n) is earlier than the processing start time for the step P (i, j), or Tw2 (P (a, n), P (i, j)) is a time difference between the processing start time for the step P (a, n) and the processing end time for the step P (i, j) if the manufacturing apparatus for executing the processing of the step P (a, n) cannot perform the batch processing and the processing start time for the step P (a, n) is later than the processing start time for the step P (i, j), δ (P (a, n), P (i, j)) has a value 1 if the processing conditions for the step P (a, n) are the same as those for the step P (i, j), and has a value of 0 if the processing conditions for the step P (a, n) are different from those for the step P (i, j), and f (a, n) is a constant or a function which increases as the number of steps having the same processing conditions as those for the step P (a, n) increases, step moving means for changing the processing start and end times Ts (a, n) and Te (a, n) in such a manner that the processing of each step is started at the time when the variable F (a, n) is equal to or smaller than a preset constant Fmax sequentially from a step having the greatest absolute value of the variable F (a, n) obtained by the variable calculating means so that an initial manufacturing project is created, initial manufacturing project duplicating means for duplicating the initial manufacturing project created by the step moving means to create two initial manufacturing projects, and constraint condition canceling means for correcting one of the initial manufacturing projects created by the initial manufacturing project duplicating means in such a manner that the initial manufacturing project does not violate preset constraint conditions so that a manufacturing project is formed, wherein the step allocating means has the function of calculating the processing start and end times Ts (a, n) and Te (a, n) for the manufacturing step which should be updated, with Equation (6), based on the updated line information fetched by the line update information fetching means and the other initial manufacturing project created by the initial manufacturing project duplicating means, and wherein the variable calculating means has the function of calculating, with Equation (7), the variable F (a, n) of the manufacturing step which should be updated.

11. The device according to claim 10, further comprising forward moving means for moving forward the processing start and end times Ts (a, n) and Te (a, n) for each manufacturing step of the manufacturing project formed by the constraint condition canceling means within the range in which the manufacturing project does not violate the constraint conditions.

12. The device according to claim 10, further comprising initial manufacturing project forming time checking means for deciding whether the variable F (a, n) should be calculated again by the variable calculating means or not after the step allocating means finds the variable F (a, n), causing the variable calculating means to calculate the variable F (a, n) again, then causing the step moving means to change the processing start and end times Ts (a, n) and Te (a, n) again so as to start the processing at the time when the variable F (a, n) calculated again is equal to or smaller than a preset constant Fmax so that the initial manufacturing project is created if the initial manufacturing project forming time checking means decides that the variable F (a, n) should be calculated again, and causing the constraint condition canceling means to correct the initial manufacturing project created by the step allocating means in such a manner that the initial manufacturing project does not violate preset constraint conditions so that the manufacturing project is formed if the initial manufacturing project forming time checking means decides that the variable F (a, n) should not be calculated again.

13. The device according to claim 10, further comprising means for moving the nth step of a product a before or after the down period of a processor for executing the processing of the nth step of the product a if the processor is in the down state for a processing period defined by the processing start and end times Ts (a, n) and Te (a, n) obtained by the step allocating means.

14. The device according to claim 10, further comprising processor selecting means for selecting a processor which is the most suitable for the processing of each step if there are a plurality of processors used for the processing of each step.

15. The device according to claim 10, further comprising:

constant setting means having initializing means for setting constants k (a, n), m (a, n) and h (a, n) in Equation (7) to optional initial-values, constant selecting means for selecting other values which are different from the initial-values, and constant changing means for changing the constants k (a, n), m (a, n) and h (a, n) from the initial-values to the other values so as to set the changed values, manufacturing project evaluating means for evaluating the validity of the manufacturing project formed by the constraint condition canceling means, and constant setting time checking means for deciding whether a time for the processing executed by the constant setting means is within the range of a preset constant setting time, causing the constant setting means to continue the processing if the time for the processing is shorter than the constant setting time, and causing the constant setting means to complete the processing if the time for the processing is equal to or longer than the constant setting time, wherein the variable calculating means has the function of calculating the variable F (a, n) with Equation (7) based on the initial value set by the initializing means and the changed value set by the constant changing means.

* * * * *

UNITED STATES PATENT AND TRADEMARK OFFICE
CERTIFICATE OF CORRECTION

PATENT NO. : 5,737,228
DATED : April 7, 1998
INVENTOR(S) : Ishizuka et al

It is certified that error appears in the above-identified patent and that said Letters Patent is hereby corrected as shown below:

Column 3, line 48, change "l=1 j=1" to --i=1 j=1--.
Column 4, line 60, change "l=1 j=1" to --i=1 j=1--.
Column 6, line 27, change "l=1 j=1" to --i=1 j=1--.
Column 8, line 5, change "l=1 j=1" to --i=1 j=1--.
Column 14, line 59, change "l=1 j=1" to --i=1 j=1--.
Column 20, line 22, change "l=1 j=1" to --i=1 j=1--.

UNITED STATES PATENT AND TRADEMARK OFFICE
CERTIFICATE OF CORRECTION

PATENT NO. : 5,737,228
DATED : April 7, 1998
INVENTOR(S) : Ishizuka et al.

It is certified that error appears in the above-identified patent and that said Letters Patent is hereby corrected as shown below:

In the Claims:

Claim 2, Equation (2), column 29, line 3, change "l=1 j=1" to --i=1 j=1--.

Claim 3, Equation (3), column 29, line 64, change "(P(a,n),P(i,j)" (second occurance) to --(P(a,n),P(i,j))--;
    Equation (3), column 29, line 64, change "l=1 j=1" to --i=1 j=1--;
    line 15, column 30, change "ts" to --is--; and
    line 17, column 30, change "seep" to --step--.

Claim 4, Equation (5), column 31, line 24, change "l=1 j=1" to --i=1 j=1--

Claim 7, line 6, change "Ts (a, n" to --Ts (a, n)--.

Claim 10, Equation (7), column 33, line 57, change "l=1 j=1" to --i=1 j=1--;
    line 8, column 34, change "F" to --P--.
    line 19, column 34, change "(a, n))" to --(a, n)--.

Signed and Sealed this

Twenty-third Day of May, 2000

Attest:

*Attesting Officer*

Q. TODD DICKINSON

*Director of Patents and Trademarks*